United States Patent
Mu et al.

(10) Patent No.: US 10,701,632 B2
(45) Date of Patent: Jun. 30, 2020

(54) WAKEUP PACKET MODULATION AND DEMODULATION

(71) Applicant: Marvell World Trade Ltd., St. Michael (BB)

(72) Inventors: Hua Mu, Orlando, FL (US); Rui Cao, Fremont, CA (US); Xiayu Zheng, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/030,264

(22) Filed: Jul. 9, 2018

(65) Prior Publication Data

US 2019/0028968 A1     Jan. 24, 2019

Related U.S. Application Data

(60) Provisional application No. 62/534,114, filed on Jul. 18, 2017.

(51) Int. Cl.
*H04W 52/02*   (2009.01)
*H04L 27/26*   (2006.01)
(Continued)

(52) U.S. Cl.
CPC ... *H04W 52/0229* (2013.01); *H04L 25/03006* (2013.01); *H04L 27/2602* (2013.01);
(Continued)

(58) Field of Classification Search
CPC ....... H04B 7/2656; H04L 1/0083; H04L 5/14; H04L 27/2602; H04L 69/22; H04W 88/10;
(Continued)

(56) References Cited

U.S. PATENT DOCUMENTS

2005/0271151 A1   12/2005   Cho et al.
2006/0018279 A1*   1/2006   Agrawal .............. H04B 7/2656
                                                                    370/330
(Continued)

FOREIGN PATENT DOCUMENTS

CN      107800526     3/2018
WO    WO-2018/032774  2/2018

OTHER PUBLICATIONS

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).
(Continued)

*Primary Examiner* — Jung Liu

(57) ABSTRACT

A first communication device generates and transmits a wakeup packet configured to cause a wakeup radio of a second communication device to prompt a wireless local area network (WLAN) network interface device of the second communication device to transition from a low power state to an active state. The wakeup packet is generated to include i) a WLAN legacy preamble, ii) a wakeup radio (WUR) preamble, and iii) a data portion. The data portion comprises a plurality of time segments, each time segment corresponds to a respective information bit. The data portion is generated to include a respective prefix inserted prior to each time segment corresponding to the respective bit to mitigate intersymbol interference at a receiver caused at least by multipath effects.

24 Claims, 14 Drawing Sheets

(51) Int. Cl.
*H04L 25/03* (2006.01)
*H04W 84/12* (2009.01)

(52) U.S. Cl.
CPC ..... *H04L 27/2605* (2013.01); *H04W 52/0235* (2013.01); *H04W 84/12* (2013.01)

(58) Field of Classification Search
CPC ............ H04W 92/10; H04W 52/0216; H04W 52/0229; H04W 84/12; H04W 4/20; Y02D 70/00; Y02D 70/449; Y02D 70/1222; Y02D 70/1242; Y02D 70/21; Y02D 70/1244; Y02D 70/1262; Y02D 70/166; Y02D 70/142; Y02D 70/144; Y02D 70/162; Y02D 70/26
See application file for complete search history.

(56) References Cited

U.S. PATENT DOCUMENTS

| | | | |
|---|---|---|---|
| 2014/0112225 A1 | 4/2014 | Jafarian et al. | |
| 2015/0208349 A1 | 7/2015 | Ramamurthy et al. | |
| 2016/0366644 A1 | 12/2016 | Ghosh et al. | |
| 2016/0374020 A1 | 12/2016 | Azizi et al. | |
| 2017/0026907 A1* | 1/2017 | Min | H04W 52/0229 |
| 2017/0094600 A1 | 3/2017 | Min et al. | |
| 2017/0111858 A1* | 4/2017 | Azizi | H04W 52/0212 |
| 2018/0019902 A1* | 1/2018 | Suh | H04L 27/2602 |
| 2018/0020405 A1* | 1/2018 | Huang | H04W 52/0229 |
| 2018/0077641 A1* | 3/2018 | Yang | H04W 4/20 |
| 2018/0184379 A1 | 6/2018 | Liu et al. | |
| 2018/0206192 A1 | 7/2018 | Vermani et al. | |
| 2018/0376370 A1 | 12/2018 | Shellhammer et al. | |
| 2019/0082385 A1 | 3/2019 | Shellhammer et al. | |

OTHER PUBLICATIONS

Park et al., "Proposal for Wake-Up Receiver (WUR) Study Group," IEEE Draft 802.11-16/0722r1, 14 pages (May 18, 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

Chun et al., "Legacy Support on HEW frame structure," doc: IEEE 11-13/1057r0, *The Institute of Electrical and Electronics Engineers, Inc.*, pp. 1-8 (Sep. 2013).

International Search Report and Written Opinion in International Patent Application No. PCT/US2018/041253, dated Oct. 9, 2018 (11 pages).

* cited by examiner

Detect a non-legacy preamble of packet, wherein the non-legacy preamble spans a first frequency bandwidth, wherein the non-legacy preamble follows, in time, a WLAN legacy preamble of the packet, wherein the WLAN legacy preamble spans a second frequency bandwidth wider than the first frequency bandwidth 1404

Process a data portion of the packet, wherein the data portion of the packet spans the first frequency bandwidth, and wherein processing the data portion includes:

measuring a respective energy level corresponding to each time segment of the data portion, and using the respective energy level to determine a value of a respective bit corresponding to the respective time segment 1408

WAKEUP PACKET MODULATION AND DEMODULATION

CROSS REFERENCES TO RELATED APPLICATIONS

This application claims the benefit of U.S. Provisional Patent Application No. 62/534,114, entitled "Wakeup Radio (WUR) Waveform Design," filed on Jul. 18, 2017, the disclosure of which is hereby expressly incorporated herein by reference in its entirety.

FIELD OF TECHNOLOGY

The present disclosure relates generally to wireless communication systems, and more particularly to formats of packets for communication systems employing wakeup radios (WURs).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup packet addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment a method is performed by a first communication device, and is for transmitting a wakeup packet configured to cause a wakeup radio of a second communication device to prompt a wireless local area network (WLAN) network interface device of the second communication device to transition from a low power state to an active state. The method comprising: generating, at the first communication device, a WLAN legacy preamble of the wakeup packet; generating, at the first communication device, a wakeup radio (WUR) preamble of the wakeup packet; and generating, at the first communication device, a data portion of the wakeup packet, including generating a plurality of orthogonal frequency division multiplexing (OFDM) symbols, wherein: the data portion comprises a plurality of time segments, each time segment including a respective segment, in time, of a first electrical signal, each time segment of the data portion corresponds to a respective information bit, generating the data portion further includes inserting a respective prefix prior to each time segment corresponding to the respective bit to mitigate intersymbol interference at a receiver caused at least by multipath effects, and each prefix includes a respective second electrical signal. The method also includes: transmitting, by the first communication device, the wakeup packet.

In another embodiment, an apparatus comprises: a network interface device associated with a first communication device. The network interface device comprises one or more integrated circuit (IC) devices configured to: generate a wireless local area network (WLAN) legacy preamble of a wakeup packet, wherein the wakeup packet is configured to cause a wakeup radio of a second communication device to prompt a WLAN network interface device of the second communication device to transition from a low power state to an active state. The one or more IC devices are further configured to: generate a wakeup radio (WUR) preamble of the wakeup packet, and generate a data portion of the wakeup packet, including generating a plurality of orthogonal frequency division multiplexing (OFDM) symbols, wherein: the data portion comprises a plurality of time segments, each time segment including a respective segment, in time, of a first electrical signal, each time segment of the data portion corresponds to a respective information bit, generating the data portion further includes inserting a respective prefix prior to each time segment corresponding to the respective bit to mitigate intersymbol interference at a receiver caused at least by multipath effects, and each prefix includes a respective second electrical signal. The one or more IC devices are further configured to transmit the wakeup packet.

In yet another embodiment, a method is performed by a wakeup radio of a communication device, and is for processing a wakeup packet configured to cause the wakeup radio (WUR) of the communication device to prompt a wireless local area network (WLAN) network interface device of the communication device to transition from a low power state to an active state. The wakeup packet includes a data portion comprising i) a plurality of time segments and ii) prefixes between adjacent time segments. Each time segment includes a respective segment, in time, of a first electrical signal, and wherein each prefix includes a respective second electrical signal. The method includes: detecting, at the WUR, a WUR preamble of the wakeup packet, wherein the WUR preamble follows, in time, a WLAN legacy preamble of the wakeup packet; and processing, at the WUR, the data portion of the wakeup packet, including: measuring a respective energy level corresponding to each time segment of the data portion, and using the respective energy level to determine a value of a respective bit corresponding to the respective time segment of the data portion.

In still another embodiment, an apparatus comprises: a wakeup radio WUR associated with a wireless local area network (WLAN) network interface device. The WUR comprises one or more integrated circuit (IC) devices configured to: detect a WUR preamble of a wakeup packet, wherein the WUR preamble follows, in time, a WLAN legacy preamble of the wakeup packet, wherein the wakeup packet further includes a data portion comprising a plurality of time segments and prefixes between adjacent time segments, wherein each time segment includes a respective segment, in time, of a first electrical signal, and wherein each prefix includes a respective second electrical signal, and process the data portion of the wakeup packet, including: measuring a respective energy level corresponding to each time segment of the data portion, and using the respective energy level to determine a value of a respective bit corresponding to the respective time segment of the data portion.

BRIEF DESCRIPTION OF THE DRAWINGS

FIG. 14 is a flow diagram of an example method for processing a packet, according to an embodiment.

DETAILED DESCRIPTION

Techniques for generating and processing packets are described below in the context of low power wakeup radios merely for explanatory purposes. In other embodiments, packet generation and processing techniques are utilized in other types of wireless communication systems such as personal area networks (PANs), mobile communication networks such as cellular networks, metropolitan area networks (MANs), satellite communication networks, etc., that use a narrower bandwidth than WLANs.

Figure 1A:
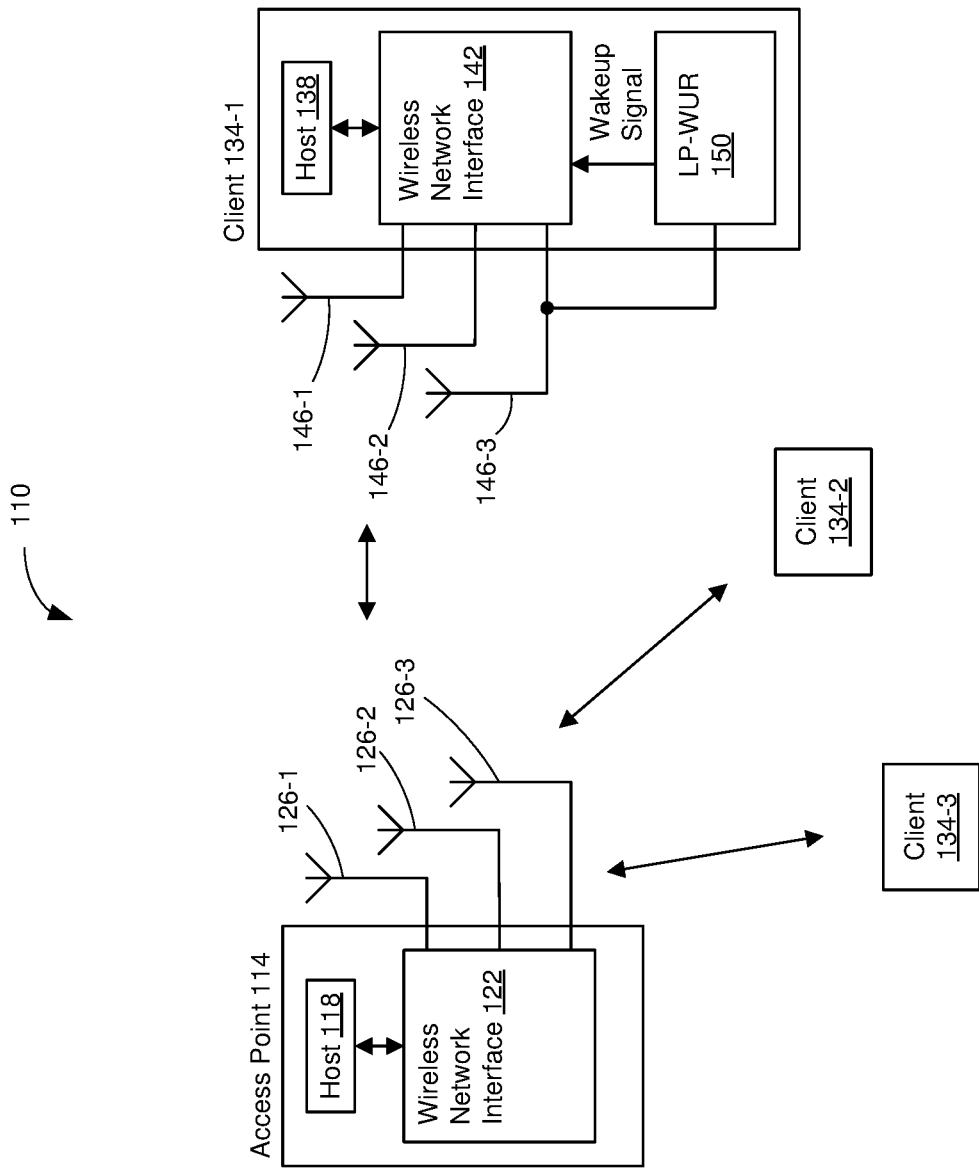
FIG. 1A is a block diagram of an example wireless local area network (WLAN) having a client station with a low power wakeup radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wakeup radios (LP-WURs) in the WLAN 110.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1B:
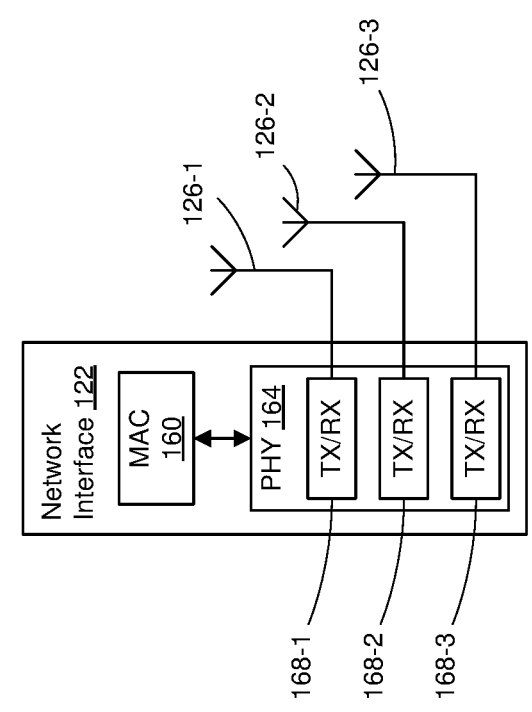
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units.

In connection with generating one or more radio frequency (RF) signals for transmission, the PHY processor 164 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 138.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which may include demodulating, filtering, etc.) the one or more digital baseband signals to generate a PPDU.

The PHY processor 164 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

Figure 1C:
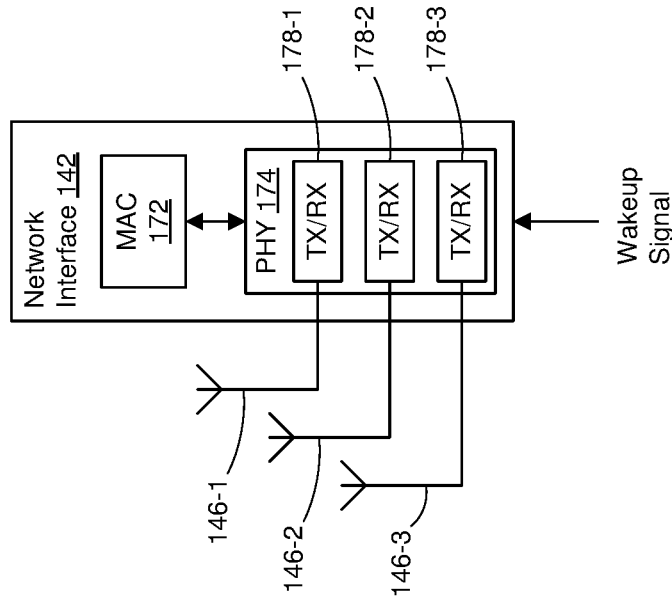
FIG. 1C is a block diagram of an example wireless network interface device of the client station included in the WLAN of FIG. 1A, according to an embodiment.

FIG. 1C is a block diagram of the network interface device 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 134-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

Figure 1D:
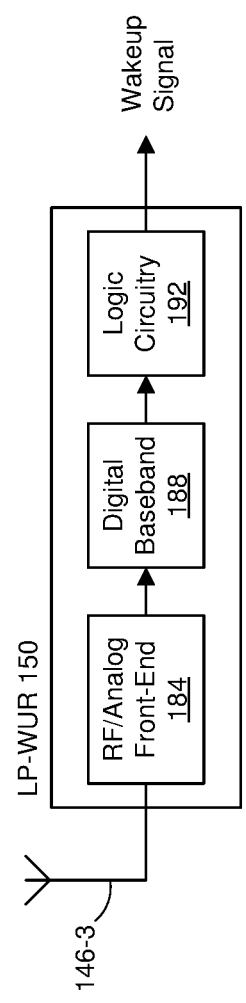
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a wakeup packet. The digital baseband circuitry 188 includes a demodulator that demodulates data from the digital baseband signal to generate an information signal corresponding to information included in a wakeup packet.

The digital baseband circuitry 188 is coupled to logic circuitry 192. The logic circuitry 192 is configured to process the information signal to determine whether a wakeup packet includes an address (e.g., a MAC address, an AID, or another suitable network address) corresponding to the client station 134-1, according to an embodiment. The logic circuitry 192 is configured to generate the wakeup signal in response to determining that a received wakeup packet includes the address corresponding to the client station 134-1.

Figure 2:
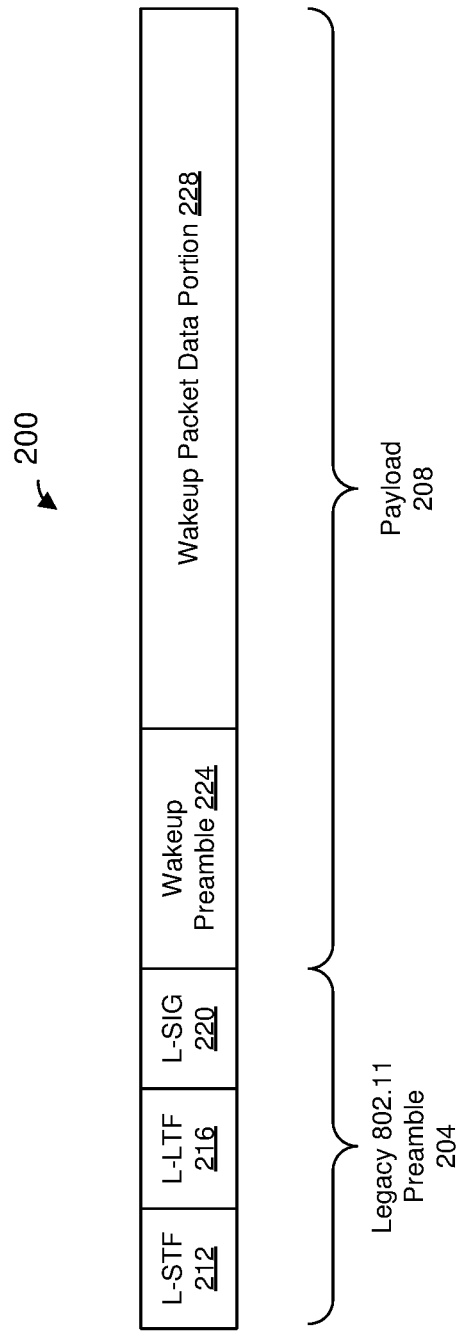
FIG. 2 is a diagram of a wakeup packet, according to an embodiment.

FIG. 2 is a block diagram of a wakeup packet 200 used in the example WLAN 110 of FIG. 1, according to an embodiment. The network interface 122 of the AP 114 is configured to generate and transmit the wakeup packet 200, according to an embodiment. The network interface 142 of the client station 134-1 is also configured to generate and transmit the wakeup packet 200, e.g., to prompt another client station 134 to wake up from a low power state, according to another embodiment.

The LP-WUR 150 of the client station 134-1 is configured to receive, detect, and decode the wakeup packet 200, according to an embodiment.

The wakeup packet 200 includes a legacy 802.11 preamble 204 and a payload 208. The legacy 802.11 preamble 204 corresponds to a legacy preamble defined by the IEEE 802.11 Standard, according to an embodiment. The legacy 802.11 preamble 204 enables IEEE 802.11 stations (e.g., wireless communication devices that are configured to operate according to the IEEE 802.11 Standard) to detect the wakeup packet 200 and determine a length of the wakeup packet 200 for the purpose of reducing transmissions by IEEE 802.11 stations that will collide with the wakeup packet 200, according to an embodiment.

The legacy 802.11 preamble 204 includes a legacy short training field (L-STF) 212, a legacy long training field (L-LTF) 216, a legacy signal field (L-SIG) 220. The L-STF 212 includes signals designed for packet detection and automatic gain control (AGC) training. The L-LTF 216 includes signals designed for channel estimation and synchronization. The L-SIG 220 includes information regarding the wakeup packet 200, including length information (e.g., in a length subfield (not shown)) that can be used by IEEE 802.11 stations to determine when the wakeup packet 200 will end.

In other embodiments, the wakeup packet includes a legacy preamble (different than the legacy 802.11 preamble 204) that enables stations that conform to a different suitable wireless communication protocol (e.g., other than the IEEE 802.11 Standard) to detect the wakeup packet 200 and determine a length of the wakeup packet 200 for the purpose of reducing transmissions by such stations that will collide with the wakeup packet 200, according to an embodiment.

The payload 208 includes a wakeup preamble 224. In an embodiment, the wakeup preamble 224 includes signals that enable LP-WURs such as the LP-WUR 150 to detect the wakeup packet 220 and to synchronize to the wakeup packet 220. The payload 208 also includes a wakeup packet data portion 228. In an embodiment, the wakeup packet data portion 228 includes an address (e.g., a MAC address, an AID, or another suitable network address) corresponding to a client station (or client stations) to which the wakeup packet 200 is intended. Referring now to FIG. 1D, the digital baseband circuitry 188 is configured to detect the wakeup packet 200 at least by detecting the wakeup preamble 224, according to an embodiment. The logic circuitry 192 is configured to process the wakeup packet body 228 to determine whether the wakeup packet body 228 includes an address (e.g., a MAC address, an AID, or another suitable network address) corresponding to the client station 134-1.

In an embodiment, the legacy 802.11 preamble 204 spans a first frequency bandwidth, and the wakeup preamble 224 and the wakeup packet data portion 228 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc.

The wakeup packet body 228 includes a plurality of information bits encoded using a plurality of orthogonal frequency division multiplexing (OFDM) symbols. An electrical signal corresponding to the wakeup packet body 228 comprises a plurality of time segments, where each time segment of the electrical signal corresponds to a respective information bit, and where each time segment corresponds to N OFDM symbols. In an embodiment, $N=1$, and each time segment of the electrical signal corresponds to a respective OFDM symbol. In another embodiment, N is a positive integer greater than one (e.g., $N=2, 3, 4, \ldots$), and each time segment of the electrical signal corresponds to a respective set of N OFDM symbols. In another embodiment, N is a fraction (e.g., $N=\frac{1}{2}, \frac{1}{4}, \ldots$), and each OFDM symbol corresponds to multiple time segments.

Each OFDM symbol comprises a plurality of subcarriers (sometimes referred to as "tones"). The plurality of subcarriers include a plurality of data subcarriers and a plurality of non-data subcarriers, such as one or more of i) pilot tones, ii) guard tones, iii) direct current (DC) tones, etc., according to various embodiments. In an embodiment, generating an OFDM symbol includes: i) setting a frequency domain sequence corresponding to the plurality of subcarriers to desired frequency domain values, and ii) performing an IDFT (e.g., an IFFT) on the frequency domain sequence to generate a time-domain sequence. For example, the PHY processor 164 (FIG. 1B) includes an IDFT calculator (e.g., an IFFT calculator) configured to perform an IDFT (e.g., an IFFT) on the frequency domain sequence to generate a time-domain sequence corresponding to the OFDM symbol.

In some embodiments, information bits in the wakeup packet data portion 228 are encoded using an on-off keying (OOK) technique. For example, when N is at least one: i) a first value of an information bit is represented by setting at least some data tones in the corresponding N OFDM symbol(s) to non-zero power values, and ii) a second value of the information bit is represented by setting at least all of the data tones in the corresponding N OFDM symbol(s) to zero power values. As another example, when N is at least one: i) a first value of an information bit is represented by setting at least some data tones in the corresponding N OFDM symbol(s) to non-zero power values, and ii) a second value of the information bit is represented by generating a time-domain sequence corresponding to a zero power signal (e.g., a time-domain sequence of zeros), e.g., without performing an IDFT.

Data tones are set to non-zero power values such as 1, −1, or one or more other suitable values, in various embodiments. The non-zero power values are chosen to provide an adequate peak-to-average power ratio (PAPR), according to an embodiment. In an embodiment, the first value of the information bit is represented by setting all data tones in the corresponding N OFDM symbol(s) to non-zero power values. In another embodiment, the first value of the information bit is represented by setting only a subset data tones in each of the corresponding N OFDM symbol(s) to non-zero power values. For example, every K-th subcarrier in each of the corresponding N OFDM symbol(s) are set to non-zero power values, whereas subcarriers between pairs of the K-th subcarriers are set to zero power values, where K is a suitable integer greater than one.

Figure 3:
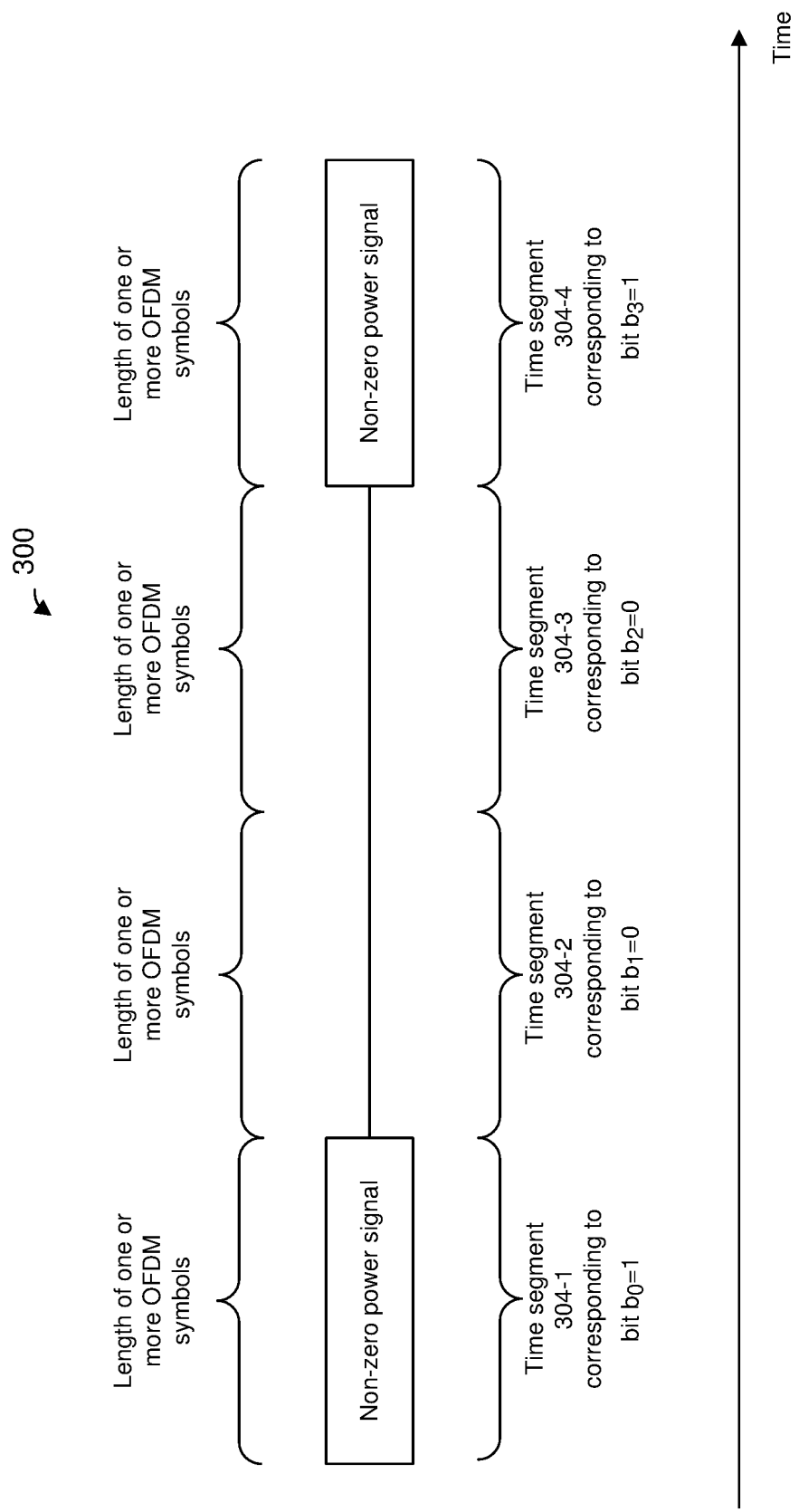
FIG. 3 is a diagram of a time-domain signal corresponding to a data portion of a wakeup packet with information bits represented using on off keying (OOK), according to an embodiment.

FIG. 3 is a diagram of a time-domain signal 300 corresponding to representing information bits using an OOK technique when N is at least one, according to an embodiment. In the example of FIG. 3, each time segment 304 of the signal 300 corresponds to i) a length (in time) of N OFDM symbol(s). Information bit $b_0$ is one and is represented by the non-zero time-domain signal corresponding to N OFDM symbol(s) with at least some data tones set to non-zero power values. Information bit $b_1$ is zero and is represented by a zero power signal. Information bit $b_2$ is zero and is represented by the zero power signal. Information bit $b_3$ is one and is represented by one or more periods of the non-zero time-domain signal.

When N is less than one, each OFDM symbol corresponds to multiple time segments (where each time segment of the signal corresponds to a respective information bit). In an embodiment, when N is less than one, each OFDM symbol corresponds to multiple periods of a time-domain periodic signal, and each set of one or more periods corresponds to a time segment. In an embodiment, to generate the time-domain periodic signal, every K-th subcarrier in the OFDM symbol is set to a non-zero power value, whereas subcarriers between pairs of the K-th subcarriers are set to zero power values, where K is a suitable integer greater than one, and an IDFT is performed.

Figure 4:
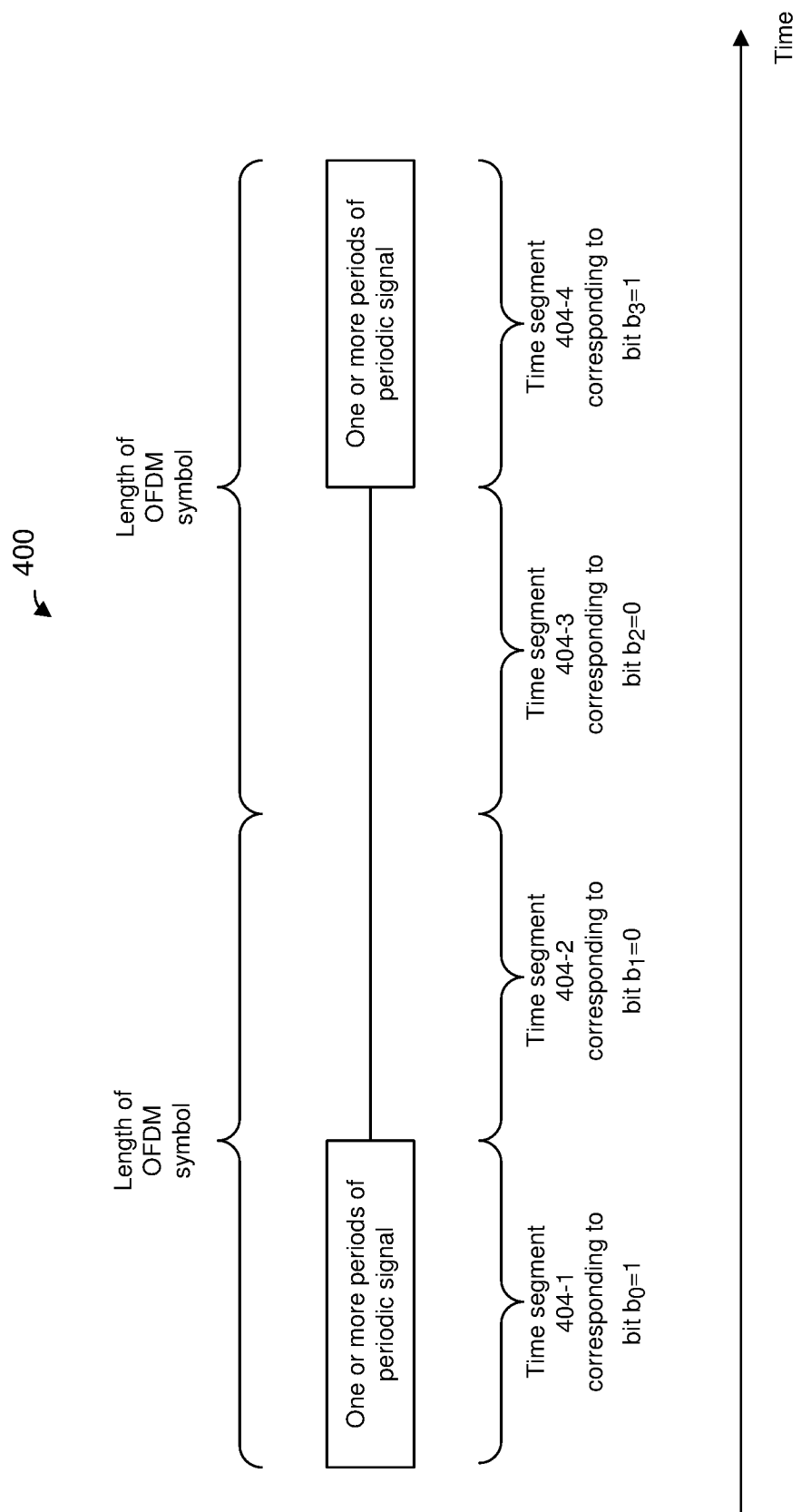
FIG. 4 is a diagram of a time-domain signal corresponding to a data portion of a wakeup packet with information bits represented using OOK, according to another embodiment.

When N is less than one, i) to represent the first value of an information bit, the time segment of the signal is set to one or more periods of the time-domain periodic signal, and ii) to represent the second value of the information bit, the time segment of the signal is set to a time-domain sequence corresponding to a zero power signal, according to an embodiment. FIG. 4 is a diagram of a time-domain signal 400 corresponding to representing information bits using an OOK technique when N is ½, according to an embodiment. In the example of FIG. 4, each time segment of the signal 404 corresponds to i) ½ a length (in time) of an OFDM symbol, and ii) one or more periods of a time-domain signal corresponding to the OFDM symbol.

Information bit $b_0$ is one and is represented by one or more periods of the time-domain signal. Information bit $b_1$ is zero and is represented by a zero power signal. Information bit $b_2$ is zero and is represented by the zero power signal. Information bit $b_3$ is one and is represented by one or more periods of the time-domain signal.

In some embodiments, information bits in the wakeup packet data portion 228 are encoded using a Manchester code technique. For example, each time segment of the electrical signal (which corresponds to an information bit) comprises a first time subsegment of the electrical signal and a second time subsegment of the electrical signal. To represent the first value of the information bit, the first time subsegment is set to the one or more periods of the time-domain periodic signal, and ii) the second time subsegment is set to the time-domain sequence corresponding to the zero power signal; to represent the second value of the information bit, the first time subsegment is set to the time-domain sequence corresponding to the zero power signal, and ii) the second time subsegment is set to one or more periods of the time-domain periodic signal, according to an embodiment.

For example, when N is an even integer greater than one: i) a first value of an information bit is represented by a) setting at least some data tones in a first set of corresponding N/2 OFDM symbol(s) to non-zero power values, and b) generating a time-domain sequence corresponding to a zero power signal (e.g., a time-domain sequence of zeros) corresponding to a second set of corresponding N/2 OFDM symbol(s); and i) a second value of the information bit is represented by a) generating the time-domain sequence corresponding to a zero power signal (e.g., a time-domain sequence of zeros) corresponding to the first set of corresponding N/2 OFDM symbol(s), and b) setting at least some data tones in the second set of corresponding N/2 OFDM symbol(s) to non-zero power values, according to an embodiment.

Figure 5:
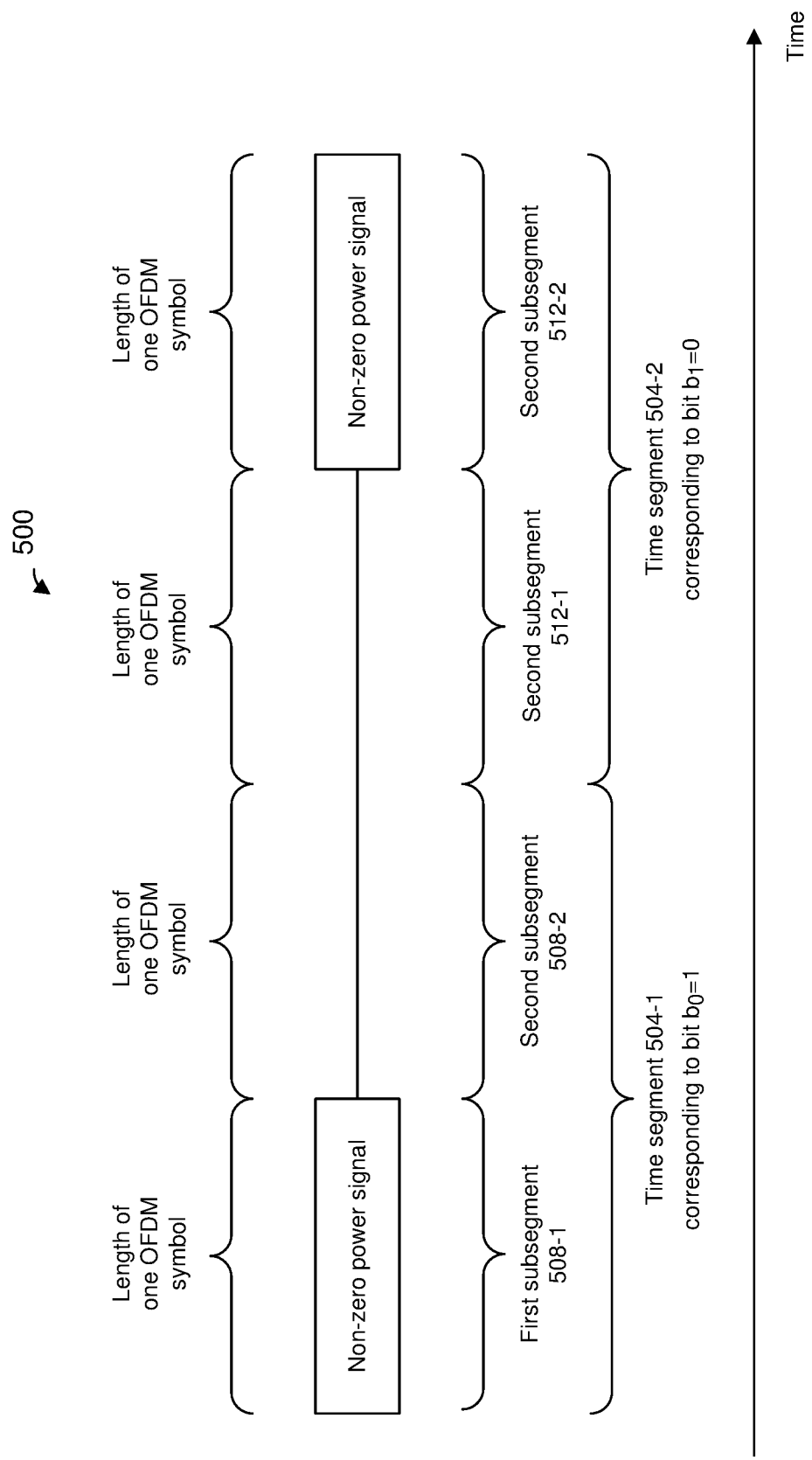
FIG. 5 is a diagram of a time-domain signal corresponding to a data portion of a wakeup packet with information bits represented using on Manchester coding, according to an embodiment.

FIG. 5 is a diagram of a time-domain signal 500 corresponding to representing information bits using a Manchester code technique when N is two, according to an embodiment. In the example of FIG. 5, each time segment of the signal 504 corresponds to a length (in time) of two OFDM symbols.

Information bit $b_0$ is one and is represented by i) setting a first time subsegment 508-1 (which corresponds to a length of one OFDM symbol) of the time segment 504-1 of the signal to the non-zero power time-domain signal, and ii) setting a second time subsegment 508-2 of the time segment 504-1 of the signal to the zero power signal. Information bit $b_1$ is zero and is represented by i) setting a first time subsegment 512-1 of the time segment 504-2 of the signal to the zero power signal, and ii) setting a second time subsegment 512-2 of the time segment 504-2 of the signal to the non-zero power signal. A length (in time) of each subsegment 508, 512 corresponds to a length in time of one OFDM symbol.

When N is one, each OFDM symbol corresponds to one time segment of the signal, which corresponds to a respective information bit. Additionally, each OFDM symbol corresponds to multiple periods of a time-domain periodic signal, and each set of one or more periods corresponds to a respective time subsegment. When N is one, i) a first value of an information bit is represented by a) setting the first time subsegment to a set of one or more periods of the time-domain periodic signal, and b) setting the second time subsegment to the time-domain sequence corresponding to the zero power signal; and i) a second value of the information bit is represented by a) setting the first time subsegment to the time-domain sequence corresponding to the zero power signal, and b) setting the second time subsegment to the set of one or more periods of the time-domain periodic signal, according to an embodiment.

Figure 6:
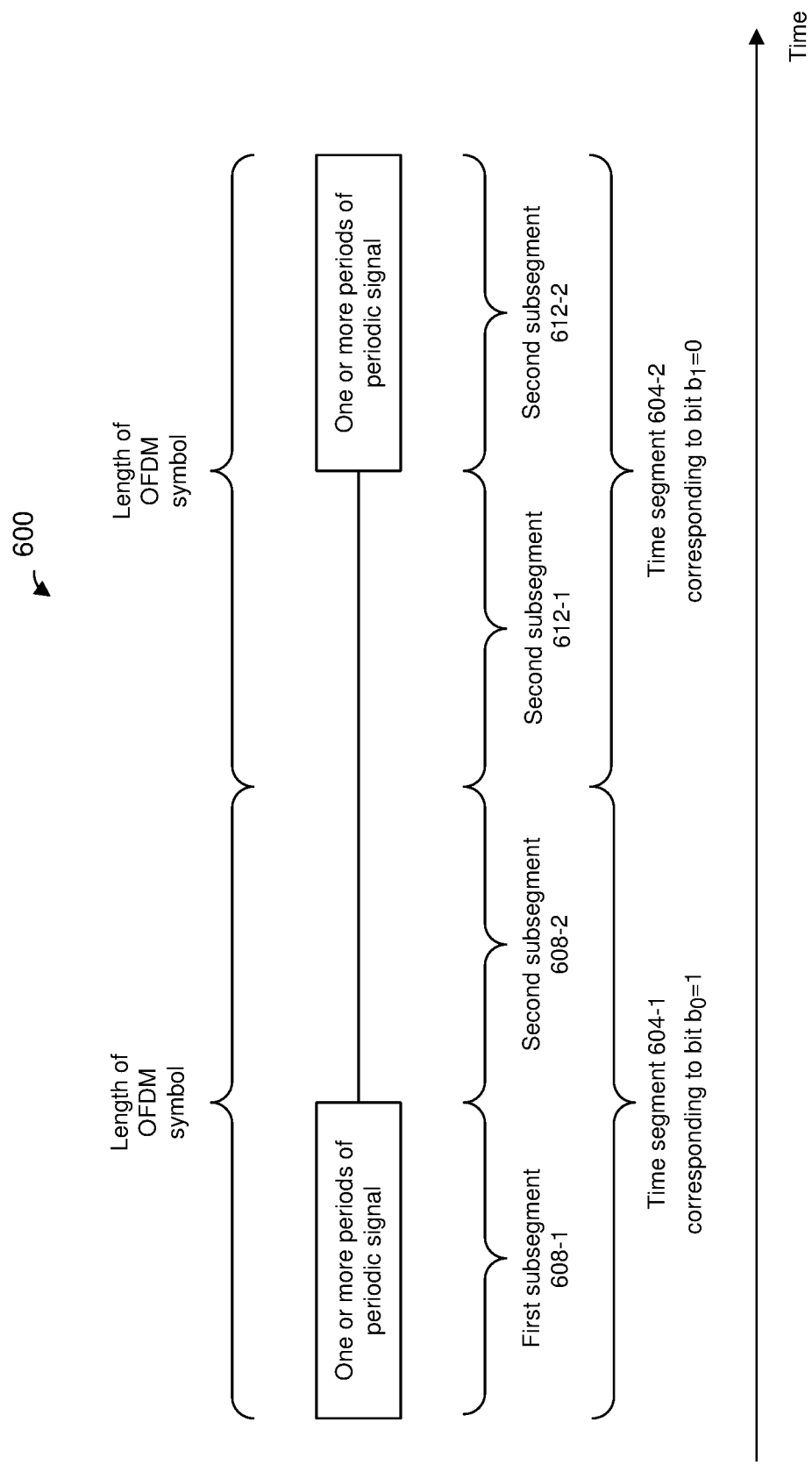
FIG. 6 is a diagram of a time-domain signal corresponding to a data portion of a wakeup packet with information bits represented using on Manchester coding, according to another embodiment.

FIG. 6 is a diagram of a time-domain signal 600 corresponding to representing information bits using a Manchester code technique when N is one, according to an embodiment. In the example of FIG. 6, each time segment of the signal 604 corresponds to i) a length (in time) of one OFDM symbol, and ii) one or more periods of a time-domain signal corresponding to the OFDM symbol.

Information bit $b_0$ is one and is represented by i) setting a first time subsegment 608-1 of the time segment of the signal 604-1 to one or more periods of the time-domain signal, and ii) setting a second time subsegment 608-2 of the time segment of the signal 604-1 to the zero power signal. Information bit $b_1$ is zero and is represented by i) setting a first time subsegment 612-1 of the time segment 604-2 to the zero power signal, and ii) setting a second time subsegment 612-2 of the time segment 604-2 to the one or more periods of the time-domain signal. A length (in time) of each subsegment 608, 612 corresponds to ½ of a length in time of one OFDM symbol.

When N is a fraction (e.g., ½, ¼, etc.), each time segment of the signal (which corresponds to a respective information bit) corresponds to a fraction (in time) of one OFDM symbol. Additionally, each OFDM symbol corresponds to multiple periods of a time-domain periodic signal, and each set of one or more periods corresponds to a respective time subsegment of the signal. When N is a fraction of one, i) a first value of an information bit is represented by a) setting the first time subsegment of the signal to a set of one or more periods of the time-domain periodic signal, and b) setting the second time subsegment of the signal to the time-domain sequence corresponding to the zero power signal; and i) a second value of the information bit is represented by a) setting the first time subsegment of the signal to the time-domain sequence corresponding to the zero power signal, and b) setting the second time subsegment of the signal to the set of one or more periods of the time-domain periodic signal, according to an embodiment.

Figure 7:
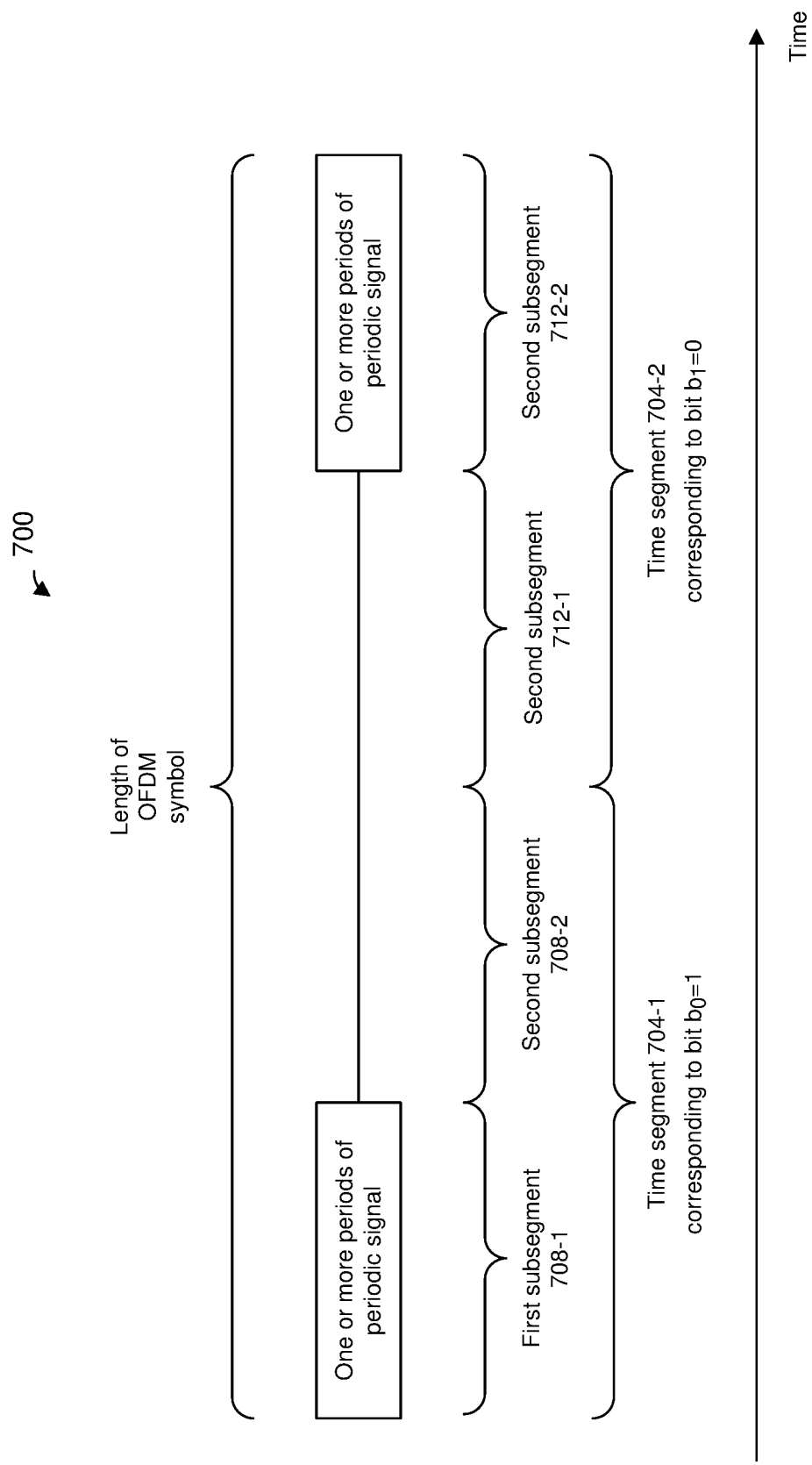
FIG. 7 is a diagram of a time-domain signal corresponding to a data portion of a wakeup packet with information bits represented using on Manchester coding, according to another embodiment.

FIG. 7 is a diagram of a time-domain signal 700 corresponding to representing information bits using a Manchester code technique when N is ½, according to an embodiment. In the example of FIG. 7, each time segment 704 corresponds to i) a length (in time) of ½ OFDM symbol, and ii) one or more periods of a time-domain signal corresponding to the OFDM symbol.

Information bit $b_0$ is one and is represented by i) setting a first time subsegment 708-1 of the time segment 704-1 of the signal to one or more periods of the time-domain signal, and ii) setting a second time subsegment 708-2 of the time segment 704-1 of the signal to the zero power signal. Information bit $b_1$ is zero and is represented by i) setting a first time subsegment 712-1 of the time segment 704-2 of the signal to the zero power signal, and ii) setting a second time subsegment 712-2 of the time segment 704-2 of the signal to the one or more periods of the time-domain signal. A length (in time) of each subsegment 708, 712 corresponds to ¼ of a length in time of one OFDM symbol.

A prefix is inserted before each time segment of the electrical signal corresponding to a set of N OFDM symbol(s) that represents an information bit. The prefix includes an electrical signal, and helps mitigate multipath effects at a receiver. In an embodiment, a length (in time) of the prefix is chosen based on a delay spread of a communication channel, in an embodiment. The prefix is a zero power signal, in an embodiment. The prefix is a suitable predetermined waveform other than a zero power signal, in an embodiment. The prefix is a repeated portion of the time segment of the signal, in an embodiment. For example, the prefix is a repeated end portion of the time segment of the signal, and such a prefix is sometimes referred to as a cyclic prefix.

Figure 8:
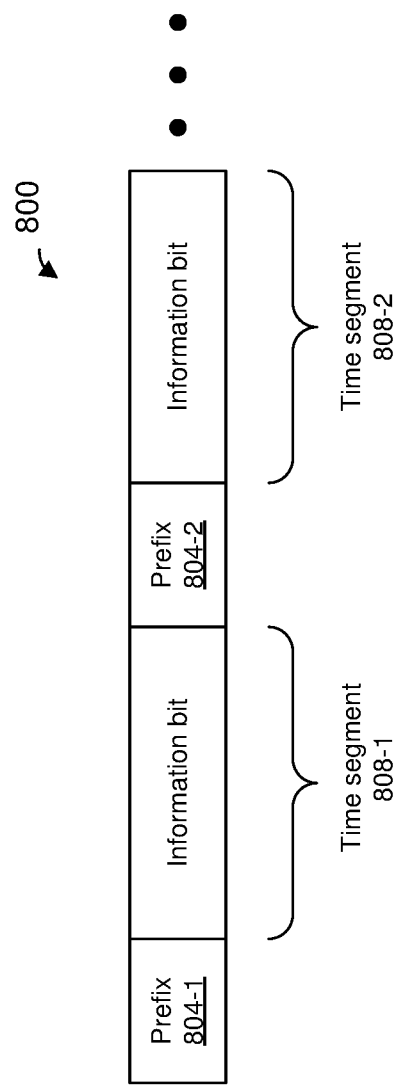
FIG. 8 is a diagram of a time-domain signal corresponding to a data portion of a wakeup packet with prefixes inserted to mitigate intersymbol interference, according to an embodiment.

FIG. 8 is a diagram of a signal 800 in which a respective prefix 804 is inserted before each time segment 808 of the signal, according to an embodiment. Each time segment 808 of the signal corresponds to a respective information bit, and each time segment corresponds to N OFDM symbols(s), as discussed above. Each prefix 804 is a zero power signal, in an embodiment. Each prefix 804 prefix is a suitable predetermined waveform other than a zero power signal, in an embodiment. Each prefix 804 prefix is a repeated portion of the time segment of the signal, in an embodiment. For example, each prefix 804 is a repeated end portion of the corresponding time segment 808 of the signal.

Figure 9:
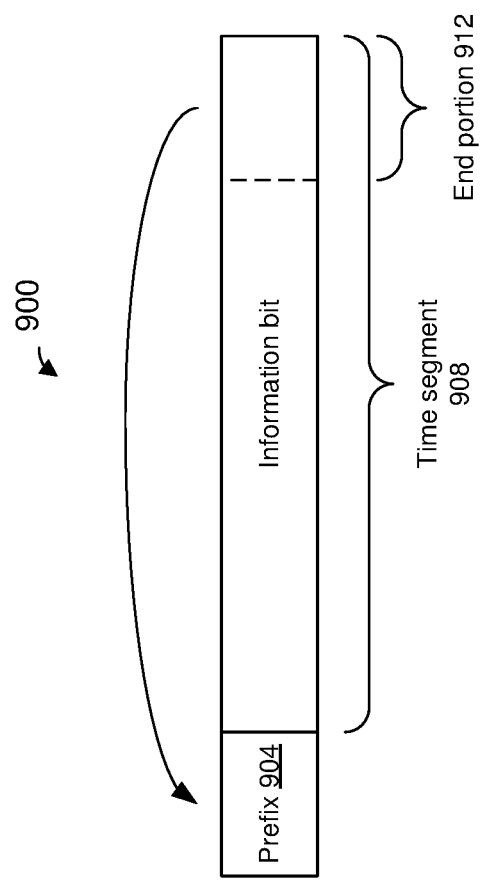
FIG. 9 is a diagram of a time-domain signal corresponding to a data portion of a wakeup packet with a cyclic prefix inserted to mitigate intersymbol interference, according to an embodiment.

FIG. 9 is a diagram of a signal 900 in which a respective cyclic prefix 904 is inserted before each time segment 908 of the signal, according to an embodiment. Each time segment 908 of the signal corresponds to a respective information bit, and each time segment corresponds to N OFDM symbols(s), as discussed above. The prefix 904 is a repeated end portion 912 of the time segment 908 of the signal.

Figure 10:
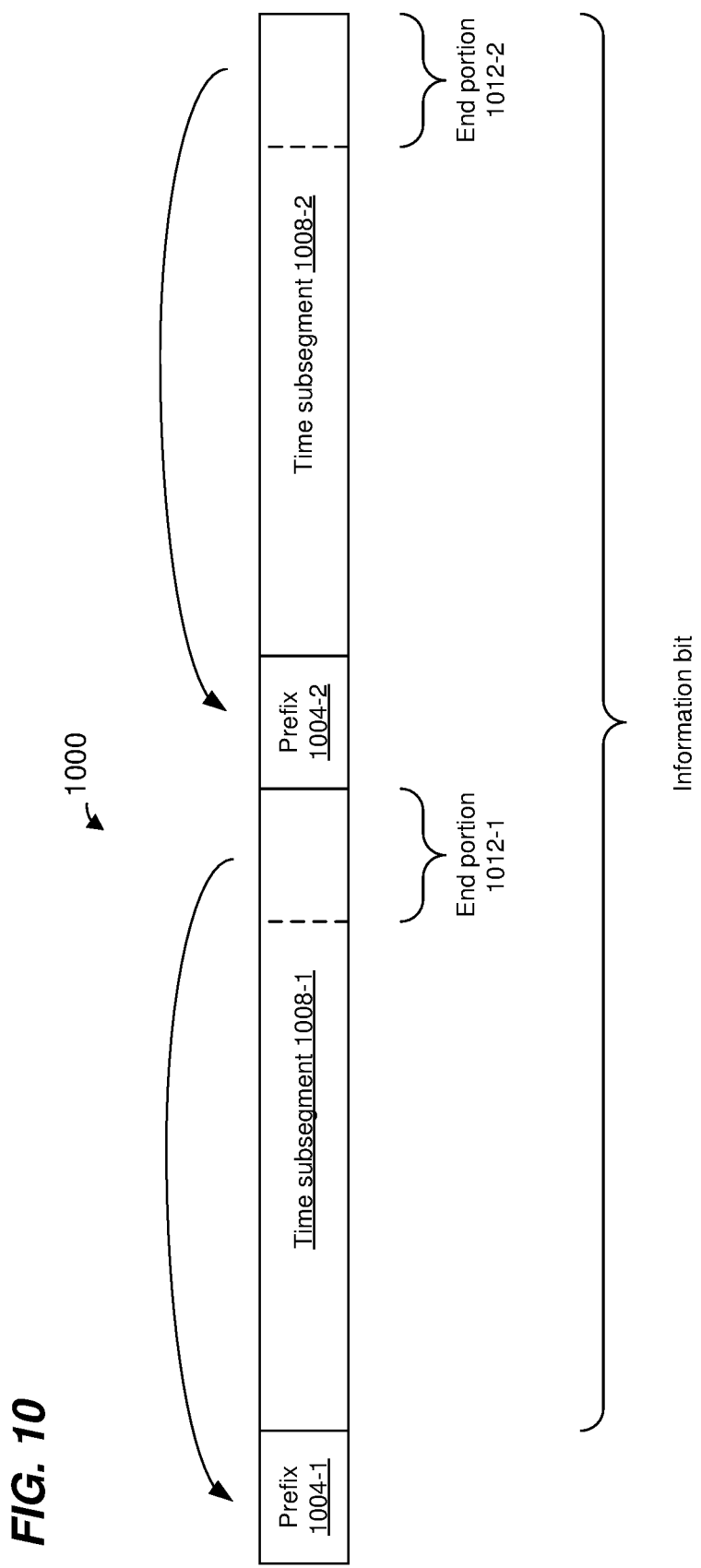
FIG. 10 is a diagram of a time-domain signal corresponding to a data portion of a wakeup packet with a cyclic prefixes inserted to mitigate inter-symbol interference, according to another embodiment.

FIG. 10 is a diagram of a signal 1000 in which a Manchester code technique is used, according to an embodiment. A respective prefix 1004 is inserted before each time subsegment 1008 of the signal. The time segments of the signal 1008-1 and 1008-2 together correspond to a respective information bit. The time segments of the signal 1008-1 and 1008-2 are halves of a time segment that corresponds to N OFDM symbols(s), as discussed above.

Each prefix 1004 is a cyclic prefix with respect to the corresponding time subsegment 1008. For example, each respective prefix 1004 is a repeated end portion 1012 of the respective time subsegment 1008 of the signal. In another embodiment, each prefix 1004 is a zero power signal. In another embodiment, each prefix 1004 prefix is a suitable predetermined waveform other than a zero power signal.

Figure 11A:
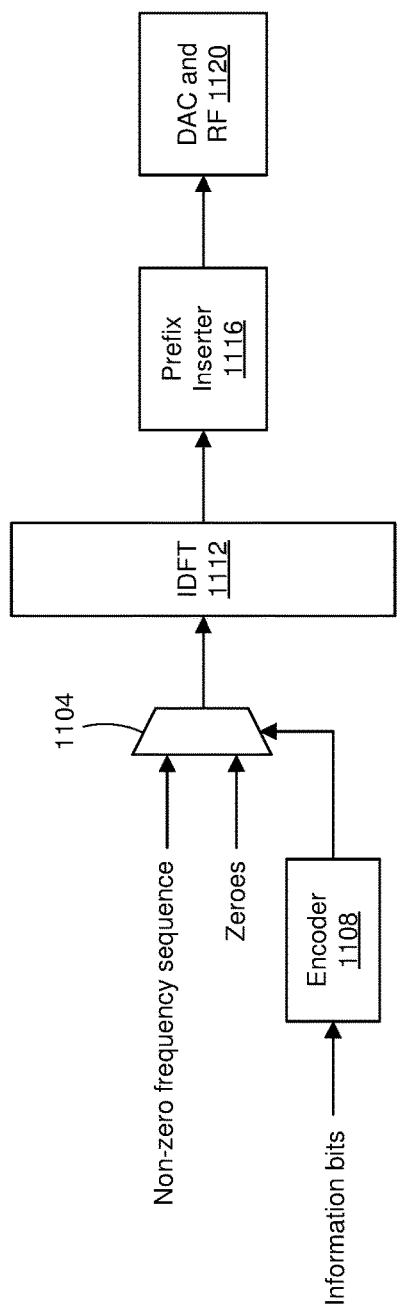
FIG. 11A is a block diagram of an example transmitter assembly, according to an embodiment.

FIG. 11A is a diagram of an example transmitter assembly 1100 configured to generate and transmit signals such as some of the signals described above, according to an embodiment. The transmitter assembly 1100 is included in the PHY processor 164 (FIG. 1B), according to an embodiment. The transmitter assembly 1100 is included in the PHY processor 174 (FIG. 1C), according to another embodiment.

The transmitter assembly 1100 includes a multiplexer 1104 controlled by an encoder 1108. The multiplexer 1104 includes a first input that receives a non-zero sequence of frequency values such as described above, and a second input that receives a sequence of zeros. The encoder 1108 receives information bits and generates a control signal to control the multiplexer 1104 to select the first input or the second input. In embodiments involving OOK encoding, the encoder 1108 controls the multiplexer 1104 such that the first input or the second input is selected for each set of N OFDM symbols, which corresponds to each time segment, and which corresponds to each information bit, where N is greater than or equal to one.

In embodiments involving Manchester encoding, the encoder 1108 controls the multiplexer 1104 such that i) one of a) the first input and b) the second input is selected for a first half of each set of N OFDM symbols (the first half corresponding to a first time subsegment of a time segment corresponding to an information bit), and ii) the other one of a) the first input and b) the second input is selected for a second half of each set of N OFDM symbols (the second half corresponding to a second time subsegment of the time segment corresponding to the information bit), where N is greater than or equal to two.

An output of the multiplexer 1104 is coupled to an input of an IDFT calculator 1112 (e.g., an IFFT calculator). The IDFT calculator 1112 performs an IDFT (e.g., an IFFT) to generate a time-domain sequence corresponding to OFDM symbols. An output of the IDFT calculator 1112 is coupled to an input of a prefix inserter 1116.

The prefix inserter 1116 inserts a prefix prior to each set of N OFDM symbol(s), where each set of N OFDM symbol(s) corresponds to an information bit, and N is greater than or equal to one. In embodiments involving Manchester encoding (and where N is greater than one), the prefix inserter 1116 i) inserts a prefix prior to each set of N OFDM symbol(s) (which also corresponds to being prior to the first half of each set of N OFDM symbols/the respective first half/first time subsegment of a time segment corresponding to an information bit), and ii) also inserts a prefix prior to each second half of each set of N OFDM symbols (which also corresponds to being prior to each second half/second time subsegment of the time segment corresponding to an information bit).

An output of the prefix inserter 1116 is coupled to analog and radio frequency (RF) circuitry 1120. The analog and RF circuitry 1120 includes a digital-to-analog converter (DAC), an RF upconverter, etc. The DAC converts time-domain sequences from the prefix inserter 1116 to an analog signal.

Figure 11B:
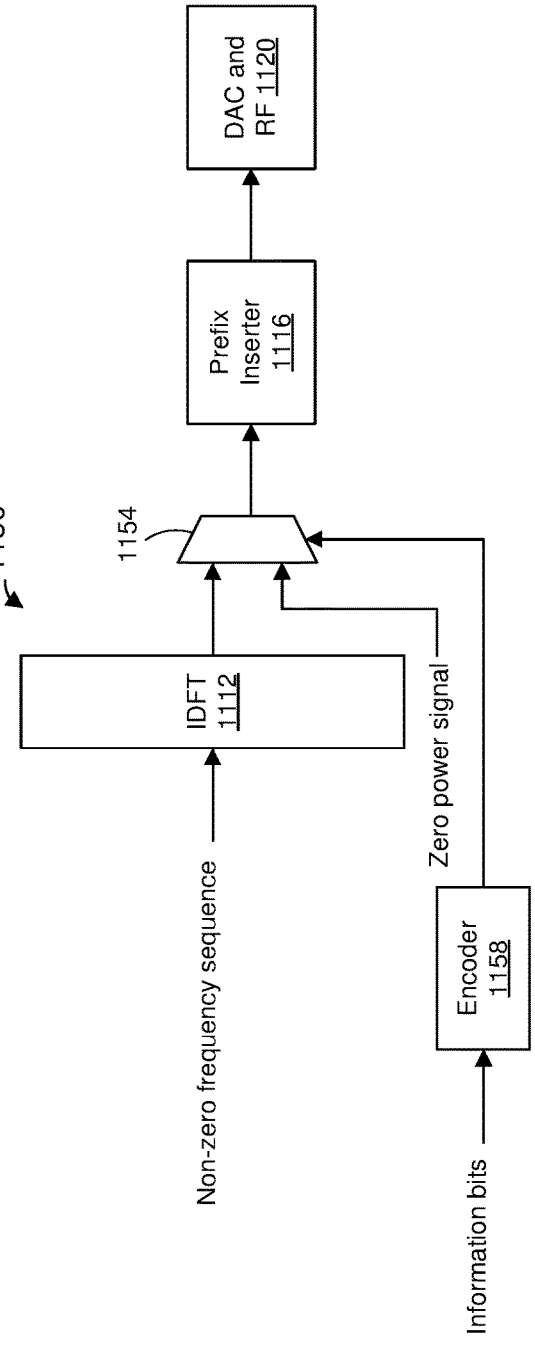
FIG. 11B is a block diagram of another example transmitter assembly, according to another embodiment.

FIG. 11B is a diagram of another example transmitter assembly 1150 configured to generate and transmit signals such as some of the signals described above, according to another embodiment. The transmitter assembly 1150 is included in the PHY processor 164 (FIG. 1B), according to an embodiment. The transmitter assembly 1150 is included in the PHY processor 174 (FIG. 1C), according to another embodiment. The transmitter assembly 1150 is similar to the transmitter assembly 1100 of FIG. 11A, and like-numbered elements are not described in detail for purposes of brevity.

The transmitter assembly 1150 can be used in embodiments in which N is a fraction of one, N is one, or N is a positive even integer greater than one.

In the transmitter assembly 1150, the input of the IDFT calculator 1112 is coupled to receive a non-zero sequence of frequency values such as described above.

The transmitter assembly 1150 includes a multiplexer 1154 controlled by an encoder 1158. The multiplexer 1154 includes a first input coupled to an output of the IDFT calculator. The multiplexer 1154 also includes a second input that receives time-domain sequence corresponding to a zero power signal. The encoder 1158 receives information bits and generates a control signal to control the multiplexer 1154 to select the first input or the second input.

In embodiments involving OOK encoding, the encoder 1158 controls the multiplexer 1154 such that the first input or the second input is selected for each set of N OFDM symbols, which corresponds to each time segment, and which corresponds to each information bit.

In embodiments involving Manchester encoding, the encoder 1158 controls the multiplexer 1154 such that i) one of a) the first input and b) the second input is selected for a first half of each set of N OFDM symbols (the first half corresponding to a first time subsegment of a time segment corresponding to an information bit), and ii) the other one of a) the first input and b) the second input is selected for a second half of each set of N OFDM symbols (the second half corresponding to a second time subsegment of the time segment corresponding to the information bit).

An output of the multiplexer 1154 is coupled to the input of the prefix inserter 1116.

Figure 12:
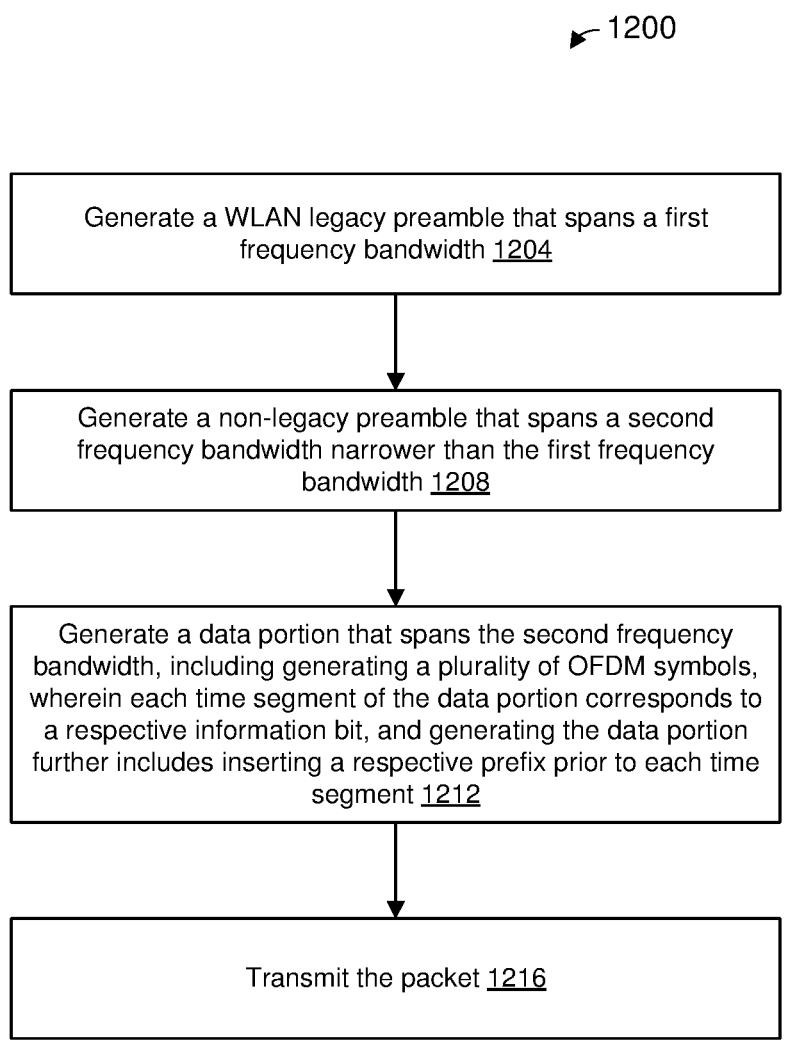
FIG. 12 is a flow diagram of an example method for transmitting a packet, according to an embodiment.

FIG. 12 is a flow diagram of an example method 1200, implemented by a first communication device, for transmitting a packet, according to an embodiment. In an embodiment, the packet is a wakeup packet configured to cause a wakeup radio of a second communication device to prompt a WLAN network interface device of the second communication device to transition from a low power state to an active state. In other embodiments, the packet is not a wakeup packet. For example, the packet is transmitted between communication devices in a wireless communication network that utilizes a narrower frequency bandwidth than WLAN networks.

In some embodiments, the network interface device 122 of FIG. 1B is configured to implement the method 1200. In some embodiments, the transmitter assembly 1100 of FIG. 11A is configured to implement at least portions of the method 1200. In some embodiments, the transmitter assembly 1150 of FIG. 11B is configured to implement at least portions of the method 1200.

The method 1200 is described in the context of the network interface device 122 of FIG. 1B, the transmitter assembly 1100 of FIG. 11A, and the transmitter assembly 1150 of FIG. 11B, merely for explanatory purposes and, in other embodiments, the method 1200 is implemented by another suitable device. For example, the network interface device 142 of FIG. 1C is configured to implement the method 1200, in another embodiment.

At block 1204, the first communication device generates (e.g., the PHY processor 164 generates) a WLAN legacy preamble of the packet. The WLAN legacy preamble spans a first frequency bandwidth. The WLAN legacy preamble is configured to be detected by WLAN network interfaces of WLAN communication devices, according to an embodiment.

At block 1208, the first communication device generates (e.g., the PHY processor 164 generates) a non-legacy preamble (e.g., a WUR preamble) of the packet. The non-legacy preamble spans a second frequency bandwidth that is narrower than the first frequency bandwidth, according to an embodiment. In an embodiment, the non-legacy preamble is configured to be detected by radios that are configured to process packets spanning the second frequency bandwidth, and which are not configured to detect the WLAN legacy preamble. In an embodiment, the non-legacy preamble is a WUR preamble that is configured to be detected by wakeup radios coupled to WLAN network interfaces.

At block 1212, the first communication device generates (e.g., the PHY processor 164 generates, the transmitter assembly 1100 generates, the transmitter assembly 1150 generates, etc.) a data portion of the packet. In an embodiment, the data portion spans the second frequency bandwidth. Block 1212 includes generating a plurality of OFDM symbols, wherein: each time segment of the data portion corresponds to a respective information bit, and block 1212 further includes inserting a respective prefix prior to each time segment corresponding to the respective bit. In an embodiment, the prefixes are for mitigating intersymbol interference at a receiver caused at least by multipath effects.

In an embodiment, each time segment comprises a first time subsegment of the data portion and second time subsegment of the data portion; inserting the respective prefix prior to each time segment comprises inserting a respective first prefix prior to each first time subsegment; and generating the data portion further includes inserting a respective second prefix prior to each second time subsegment. In an embodiment, generating each first prefix is a first cyclic prefix that comprises an end time portion of the respective first time subsegment; and each second prefix is a second cyclic prefix that comprises an end time portion of the respective second time subsegment.

In an embodiment, each time segment of the data portion is generated such that: when the corresponding information bit has a first value: the first time subsegment of the time segment corresponds to at least a time portion of an OFDM symbol with at least some subcarriers set to one or more non-zero power values, and the second time subsegment of the time segment corresponds to a zero power signal; and when the corresponding information bit has a second value: the first time subsegment of the time segment corresponds to the zero power signal, and the second time subsegment of the time segment corresponds to at least the time portion of the OFDM symbol with at least some subcarriers set to the one or more non-zero power values.

In an embodiment, each time segment corresponds to a respective OFDM symbol; and generating the data portion includes inserting the respective prefix prior to each OFDM symbol to mitigate intersymbol interference at the receiver.

In another embodiment, each time segment corresponds to a respective set of multiple OFDM symbols; and generating the data portion includes inserting the respective prefix prior to each set of multiple OFDM symbols to mitigate intersymbol interference at the receiver.

In another embodiment, each set of multiple time segments corresponds to a respective OFDM symbol; and multiple inserted prefixes correspond to each OFDM symbol.

In an embodiment, each prefix consists of a zero power signal.

In another embodiment, block 1212 comprises generating each prefix as a cyclic prefix that comprises a portion, in time, of the respective time segment.

In yet another embodiment, block 1212 comprises generating each prefix as a predetermined signal.

In an embodiment, block 1212 comprises generating each time segment of the data portion such that: the time segment corresponds to at least a time portion of an OFDM symbol with at least some subcarriers set to one or more non-zero power values when the corresponding information bit has a first value; and the time segment corresponds to a zero power signal when the corresponding information bit has a second value.

At block 1216, the first communication device transmits (e.g., the PHY processor 164 transmits) the packet.

Figure 13A:
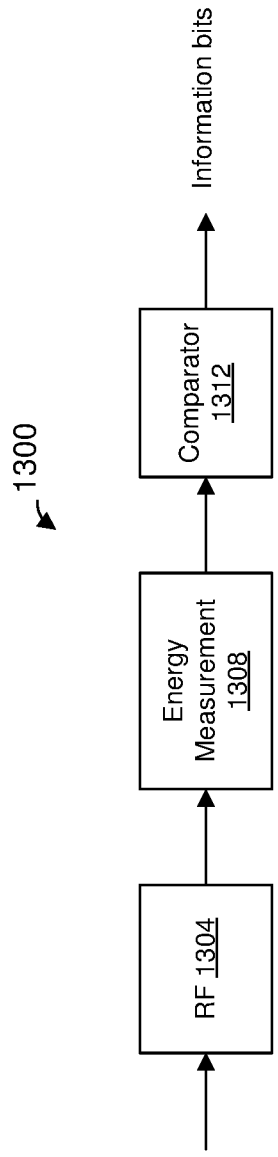
FIG. 13A is a block diagram of an example receiver assembly, according to an embodiment.

FIG. 13A is a diagram of an example receiver assembly 1300 configured to process signals such as some of the signals described above, according to an embodiment. The receiver assembly 1300 is included in the WUR 150 (FIG. 1A), according to an embodiment. The receiver assembly 1300 configured for processing an OOK encoded RF signal, according to an embodiment.

The receiver assembly 1300 includes RF circuitry 1304 (which includes, e.g., an RF downconverter) to downconvert RF signals received via an antenna to generate a lower frequency signal (e.g., a baseband signal or an intermediate frequency (IF) signal).

The receiver assembly 1300 also includes energy measurement circuitry 1308 having an input coupled to an output of the RF circuitry 1304. The energy measurement circuitry 1308 is configured to measure respective energy levels over respective time segments of the baseband signal/IF signal which corresponds to respective information bits. In an embodiment, the RF circuitry 1304 includes an analog-to-digital converter (ADC), and the energy measurement circuitry 1308 includes digital circuitry configured to measure an energy level in a sampled signal. In another embodiment, the energy measurement circuitry 1308 includes analog circuitry configured to measure an energy level of an analog signal.

The receiver assembly 1300 also includes comparator circuitry 1312 having an input coupled to an output of the energy measurement circuitry 1308. The comparator circuitry 1312 is configured to compare the respective energy levels corresponding to the respective time segments to a threshold. An output of the comparator circuitry 1312 indicates whether an information bit corresponding to a time segment is a first value or a second value. For example, when the energy level corresponding to a time segment meets the threshold, the comparator circuitry 1312 determines that the information bit has the first value, and when the energy level corresponding to the time segment does not meet the threshold, the comparator circuitry 1312 determines that the information bit has the second value, according to an embodiment.

In an embodiment, when the energy measurement circuitry 1308 measures an energy level corresponding to a time segment, the energy measurement circuitry 1308 does not measure energy in any prefixes. In an embodiment in which a transmitter added prefixes that correspond to a zero power signal, when the energy measurement circuitry 1308 measures an energy level corresponding to a time segment, the energy measurement circuitry 1308 also measures energy in a prefix that follows the time segment as part of measuring the energy level corresponding to the time segment.

Figure 13B:
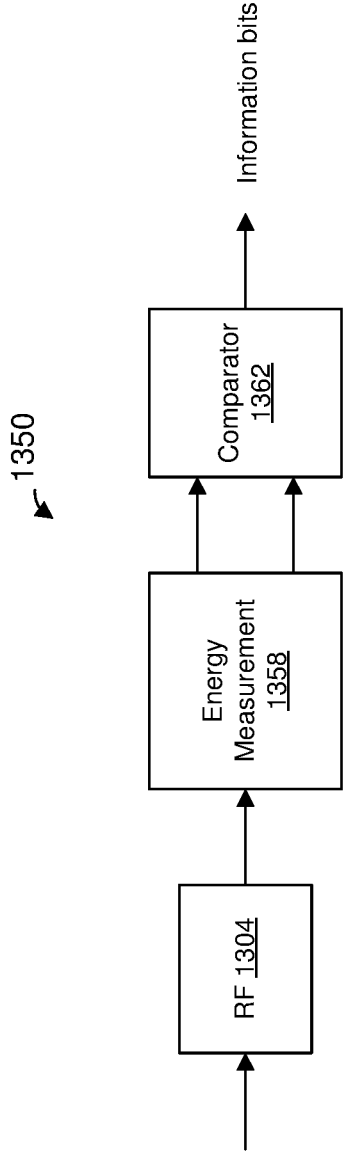
FIG. 13B is a block diagram of another example receiver assembly, according to another embodiment.

FIG. 13B is a diagram of another example receiver assembly 1350 configured to process signals such as some of the signals described above, according to an embodiment. The receiver assembly 1350 is included in the WUR 150 (FIG. 1A), according to an embodiment. The receiver assembly 1350 is configured for processing a Manchester encoded RF signal, according to an embodiment. The receiver assembly 1350 is similar to the receiver assembly 1300 of FIG. 13A, and like-numbered elements are not discussed in detail for purposes of brevity.

The receiver assembly 1350 includes energy measurement circuitry 1358 having an input coupled to an output of the RF circuitry 1304. The energy measurement circuitry 1358 is configured to measure respective energy levels over respective time segments of the baseband signal/IF signal which corresponds to respective information bits. In particular, the energy measurement circuitry 1358 is configured to measure a first energy level over a first half of a time segment of the baseband signal/IF signal, and measure a second energy level over a second half of the time segment of the baseband signal/IF signal.

In an embodiment, the RF circuitry 1304 includes an ADC, and the energy measurement circuitry 1358 includes digital circuitry configured to measure a first energy level and a second energy level in respective time subsegments of a sampled signal. In another embodiment, the energy measurement circuitry 1358 includes analog circuitry configured to measure a first energy level and a second energy level in respective time subsegments of an analog signal.

The receiver assembly 1300 also includes comparator circuitry 1362 having i) a first input coupled to a first output of the energy measurement circuitry 1358, and ii) a second input coupled to a second output of the energy measurement circuitry 1358. The comparator circuitry 1362 is configured to compare the respective first energy levels to the respective second energy levels. An output of the comparator circuitry 1362 indicates whether an information bit corresponding to a time segment is a first value or a second value. For example, when the first energy level corresponding to a first half of the time segment is greater than the second energy level corresponding to a second half of the time segment, the comparator circuitry 1312 determines that the information bit has the first value; and when the first energy level corresponding to the first half of the time segment is less than the second energy level corresponding to the second half of the time segment, the comparator circuitry 1312 determines that the information bit has the second value, according to an embodiment.

In an embodiment, when the energy measurement circuitry 1358 measures an energy level corresponding to a time subsegment, the energy measurement circuitry 1358 does not measure energy in any prefixes. In an embodiment in which a transmitter added prefixes that correspond to a zero power signal, when the energy measurement circuitry 1358 measures an energy level corresponding to a time subsegment, the energy measurement circuitry 1358 also measures energy in a prefix that follows the time subsegment as part of measuring the energy level corresponding to the time subsegment.

FIG. 14 is a flow diagram of an example method 1400, implemented by a communication device, for processing a packet, according to an embodiment. In an embodiment, the packet is a wakeup packet configured to cause a wakeup radio of the communication device to prompt a WLAN network interface device of the communication device to transition from a low power state to an active state. In other embodiments, the packet is not a wakeup packet. For example, the packet is transmitted between communication devices in a wireless communication network that utilizes a narrower frequency bandwidth than WLAN networks.

In an embodiment, the packet includes a data portion comprising a plurality of time segments and prefixes between adjacent time segments.

In some embodiments, the LP-WUR 150 of FIGS. 1A and 1D is configured to implement the method 1400. In some embodiments, the receiver assembly 1300 of FIG. 13A is configured to implement at least portions of the method 1400. In some embodiments, the receiver assembly 1350 of FIG. 13B is configured to implement at least portions of the method 1400.

The method 1400 is described in the context of the LP-WUR 150 of FIGS. 1A and 1D, the receiver assembly 1300 of FIG. 13A, and the receiver assembly 1350 of FIG. 13B, merely for explanatory purposes and, in other embodiments, the method 1400 is implemented by another suitable device.

At block 1404, the communication device detects (e.g., the LP-WUR 150 detects) a non-legacy preamble (e.g., a WUR preamble) of the packet. The non-legacy preamble spans a first frequency bandwidth. In an embodiment, the non-legacy preamble follows, in time, a WLAN legacy preamble of the packet. The WLAN legacy preamble spans a second frequency bandwidth that is wider than the first frequency bandwidth, in an embodiment. The WLAN legacy preamble is configured to be detected by WLAN network interfaces of WLAN communication devices, whereas the non-legacy preamble is configured to be detected by radios that are configured to process packets spanning the first frequency bandwidth, and which are not configured to detect the WLAN legacy preamble. In an embodiment, the non-legacy preamble is a WUR preamble that is configured to be detected by wakeup radios coupled to WLAN network interfaces.

At block 1408, the communication device processes (e.g., the LP-WUR 150 processes) the data portion of the wakeup packet. In an embodiment, the data portion spans the first frequency bandwidth. Processing the data portion of the packet includes measuring (e.g., the LP-WUR 150 measures, the energy measurement circuitry 1308 measures, the energy measurement circuitry 1358 measures, etc.) a respective energy level corresponding to each time segment of the data portion. Processing the data portion of the packet also includes using (e.g., the LP-WUR 150 uses, the comparator circuitry 1312 uses, the comparator circuitry 1362 uses, etc.) the respective energy level to determine a value of a respective bit corresponding to the respective time segment of the data portion.

In an embodiment in which the information bits have been encoded using a Manchester code, each energy level is a first energy level corresponding to a respective first time subsegment of the respective time segment of the data portion; and processing the data portion of the wakeup packet further includes measuring a respective second energy level corresponding to a respective second time subsegment of each time segment of the data portion. In such embodiments, using the respective first energy level to determine the value of the respective bit corresponding to the respective time segment of the data portion comprises: comparing the first energy level to the second energy level, and determining the value of the respective bit using the comparison of the first energy level to the second energy level.

In an embodiment, measuring the first energy level corresponding to the first time subsegment of the time segment comprises measuring the first energy level across the first time subsegment and a prefix that follows the first time subsegment; and measuring the second energy level corresponding to the second time subsegment of the time segment comprises measuring the second energy level across the second time subsegment and a prefix that follows the second time subsegment.

In an embodiment in which the information bits are encoded using OOK, measuring the energy level corresponding to the time segment comprises measuring the energy level across the entire time segment.

In another embodiment in which the information bits are encoded using OOK, measuring the energy level corresponding to the time segment comprises measuring the energy level across the time segment and a prefix that follows the time segment.

In an embodiment, each prefix corresponds to a zero power signal inserted between adjacent time segments by a transmitter.

In another embodiment, each prefix corresponds to a time portion of a respective time segment inserted before the respective time segment by a transmitter.

In another embodiment, each prefix corresponds to a predetermined signal inserted before the respective time segment by a transmitter.

In an embodiment in which the packet is a wakeup packet, the method 1400 further includes the communication device analyzing (e.g., the LP-WUR 150 analyzing, the logic circuitry 192 analyzing, etc.) determined values of the information bits to determine whether the information bits include a network address corresponding to the communication device. In some embodiments, the method 1400 further includes, when the communication device determines that the information bits include a network address corresponding to the communication device, the communication device generates (e.g., the LP-WUR 150 generates, the logic circuitry 192 generates, etc.) a wakeup signal configured to cause a WLAN network interface coupled to transition from a low power state to an active state.

Embodiment 1

A method, performed by a first communication device, for transmitting a wakeup packet configured to cause a wakeup radio of a second communication device to prompt a wireless local area network (WLAN) network interface device of the second communication device to transition from a low power state to an active state, the method comprising: generating, at the first communication device, a WLAN legacy preamble of the wakeup packet; generating, at the first communication device, a wakeup radio (WUR) preamble of the wakeup packet; and generating, at the first communication device, a data portion of the wakeup packet, including generating a plurality of orthogonal frequency division multiplexing (OFDM) symbols, wherein: the data portion comprises a plurality of time segments, each time segment including a respective segment, in time, of a first electrical signal, each time segment of the data portion corresponds to a respective information bit, generating the data portion further includes inserting a respective prefix prior to each time segment corresponding to the respective bit to mitigate intersymbol interference at a receiver caused at least by multipath effects, and each prefix includes a respective second electrical signal. The method also includes: transmitting, by the first communication device, the wakeup packet.

Embodiment 2

The method of embodiment 1, wherein: each time segment comprises a first time subsegment and second time subsegment; inserting the respective prefix prior to each time segment comprises inserting a respective first prefix prior to each first time subsegment; and generating the data portion further includes inserting a respective second prefix prior to each second time subsegment.

Embodiment 3

The method of embodiment 2, further comprising: generating each first prefix as a first cyclic prefix that comprises a duplicate of an end time portion of the respective first time subsegment; and generating each second prefix as a second cyclic prefix that comprises a duplicate of an end time portion of the respective second time subsegment.

Embodiment 4

The method of embodiment 2, wherein generating the data portion comprises generating each time segment of the data portion such that: when the corresponding information bit has a first value: the first time subsegment of the time segment corresponds to at least a time portion of an OFDM symbol with at least some subcarriers set to one or more non-zero power values, and the second time subsegment of the time segment corresponds to a zero power signal; and when the corresponding information bit has a second value: the first time subsegment of the time segment corresponds to the zero power signal, and the second time subsegment of the time segment corresponds to at least the time portion of the OFDM symbol with at least some subcarriers set to the one or more non-zero power values.

Embodiment 5

The method of any of embodiments 1-4, wherein: each time segment corresponds to a respective OFDM symbol; and generating the data portion includes inserting the respective prefix prior to each OFDM symbol to mitigate intersymbol interference at the receiver.

Embodiment 6

The method of any of embodiments 1-4, wherein: each time segment corresponds to a respective set of multiple OFDM symbols; and generating the data portion includes inserting the respective prefix prior to each set of multiple OFDM symbols to mitigate intersymbol interference at the receiver.

Embodiment 7

The method of any of embodiments 1-4, wherein: each set of multiple time segments corresponds to a respective OFDM symbol; and multiple inserted prefixes correspond to each OFDM symbol.

Embodiment 8

The method of any of embodiments 1-7, wherein each prefix consists of a zero power signal.

Embodiment 9

The method of any of embodiments 1-7, further comprising: generating each prefix as a cyclic prefix that comprises a duplicate of a portion of the respective time segment.

Embodiment 10

The method of any of embodiments 1-7, further comprising: generating each prefix as a predetermined signal.

Embodiment 11

The method of embodiment 1, wherein generating the data portion comprises generating each time segment of the data portion such that: the time segment corresponds to at least a time portion of an OFDM symbol with at least some subcarriers set to one or more non-zero power values when the corresponding information bit has a first value; and the time segment corresponds to a zero power signal when the corresponding information bit has a second value.

Embodiment 12

An apparatus, comprising: a network interface device associated with a first communication device. The network interface device comprises one or more integrated circuit (IC) devices configured to: generate a wireless local area network (WLAN) legacy preamble of a wakeup packet, wherein the wakeup packet is configured to cause a wakeup radio of a second communication device to prompt a WLAN network interface device of the second communication device to transition from a low power state to an active state. The one or more IC devices are further configured to: generate a wakeup radio (WUR) preamble of the wakeup packet, and generate a data portion of the wakeup packet, including generating a plurality of orthogonal frequency division multiplexing (OFDM) symbols, wherein: the data portion comprises a plurality of time segments, each time segment including a respective segment, in time, of a first electrical signal, each time segment of the data portion corresponds to a respective information bit, generating the data portion further includes inserting a respective prefix prior to each time segment corresponding to the respective bit to mitigate intersymbol interference at a receiver caused at least by multipath effects, and each prefix includes a respective second electrical signal. The one or more IC devices are further configured to transmit the wakeup packet.

Embodiment 13

The apparatus of embodiment 12, wherein the network interface device comprises: an inverse discrete Fourier transform (IDFT) calculator implemented on the one or more IC devices, the IDFT being configured to generate the plurality of OFDM symbols.

Embodiment 14

The apparatus of embodiment 13, wherein the network interface device further comprises: prefix inserter circuitry implemented on the one or more IC devices, the prefix inserter circuitry being configured to insert the respective prefix prior to each time segment.

Embodiment 15

The apparatus of any of embodiments 12-14, wherein: each time segment comprises a first time subsegment and second time subsegment; and the one or more IC devices are configured to: insert a respective first prefix prior to each first time subsegment, and insert a respective second prefix prior to each second time subsegment.

Embodiment 16

The apparatus of embodiment 15, wherein the one or more IC devices are configured to: generate each first prefix as a first cyclic prefix that comprises a duplicate of an end time portion of the respective first time subsegment; and generate each second prefix as a second cyclic prefix that comprises a duplicate of an end time portion of the respective second time subsegment.

Embodiment 17

The apparatus of embodiment 15, wherein the one or more IC devices are configured to generate each time segment of the data portion such that: when the corresponding information bit has a first value: the first time subsegment of the time segment corresponds to at least a time portion of an OFDM symbol with at least some subcarriers set to one or more non-zero power values, and the second time subsegment of the time segment corresponds to a zero power signal; and when the corresponding information bit has a second value: the first time subsegment of the time segment corresponds to the zero power signal, and the second time subsegment of the time segment corresponds to at least the time portion of the OFDM symbol with at least some subcarriers set to the one or more non-zero power values.

Embodiment 18

The apparatus of any of embodiments 12-17, wherein: each time segment corresponds to a respective OFDM symbol; and the one or more IC devices are configured to insert the respective prefix prior to each OFDM symbol to mitigate intersymbol interference at the receiver.

Embodiment 19

The apparatus of any of embodiments 12-17, wherein: each time segment corresponds to a respective set of multiple OFDM symbols; and the one or more IC devices are configured to insert the respective prefix prior to each set of multiple OFDM symbols to mitigate intersymbol interference at the receiver.

Embodiment 20

The apparatus of any of embodiments 12-17, wherein: each set of multiple time segments corresponds to a respective OFDM symbol; and multiple inserted prefixes correspond to each OFDM symbol.

Embodiment 21

The apparatus of any of embodiments 12-20, wherein each prefix consists of a zero power signal.

Embodiment 22

The apparatus of any of embodiments 12-20, wherein the one or more IC devices are configured to: generate each prefix as a cyclic prefix that comprises a duplicate of a portion of the respective time segment.

Embodiment 23

The apparatus of any of embodiments 12-20, wherein the one or more IC devices are configured to: generate each prefix as a predetermined signal.

Embodiment 24

The apparatus of embodiment 12, wherein the one or more IC devices are configured to generate each time segment of the data portion such that: the time segment corresponds to at least a time portion of an OFDM symbol with at least some subcarriers set to one or more non-zero power values when the corresponding information bit has a first value; and the time segment corresponds to a zero power signal when the corresponding information bit has a second value.

Embodiment 25

A method, performed by a wakeup radio of a communication device, for processing a wakeup packet configured to cause the wakeup radio (WUR) of the communication device to prompt a wireless local area network (WLAN) network interface device of the communication device to transition from a low power state to an active state, wherein the wakeup packet includes a data portion comprising a plurality of time segments and prefixes between adjacent time segments, wherein each time segment includes a respective segment, in time, of a first electrical signal, and wherein each prefix includes a respective second electrical signal, the method comprising: detecting, at the WUR, a WUR preamble of the wakeup packet, wherein the WUR preamble follows, in time, a WLAN legacy preamble of the wakeup packet; and processing, at the WUR, the data portion of the wakeup packet, including: measuring a respective energy level corresponding to each time segment of the data portion, and using the respective energy level to determine a value of a respective bit corresponding to the respective time segment of the data portion.

Embodiment 26

The method of embodiment 25, wherein: each energy level is a first energy level corresponding to a respective first time subsegment of the respective time segment of the data portion; processing the data portion of the wakeup packet further includes measuring a respective second energy level corresponding to a respective second time subsegment of each time segment of the data portion; and using the respective first energy level to determine the value of the respective bit corresponding to the respective time segment of the data portion comprises: comparing the first energy level to the second energy level, and determining the value of the respective bit using the comparison of the first energy level to the second energy level.

Embodiment 27

The method of embodiment 26, wherein: measuring the first energy level corresponding to the first time subsegment of the time segment comprises measuring the first energy level across the first time subsegment and a prefix that follows the first time subsegment; and measuring the second energy level corresponding to the second time subsegment of the time segment comprises measuring the second energy level across the second time subsegment and a prefix that follows the second time subsegment.

Embodiment 28

The method of embodiment 25, wherein measuring the energy level corresponding to the time segment comprises measuring the energy level across the entire time segment.

Embodiment 29

The method of embodiment 28, wherein measuring the energy level corresponding to the time segment comprises measuring the energy level across the time segment and a prefix that follows the time segment.

Embodiment 30

The method of any of embodiments 25-29, wherein each prefix corresponds to a zero power signal inserted between adjacent time segments by a transmitter.

Embodiment 31

The method of any of embodiments 25-28, wherein each prefix corresponds to a time portion of a respective time segment inserted before the respective time segment by a transmitter.

Embodiment 32

The method of any of embodiments 25-28, wherein each prefix corresponds to a predetermined signal inserted before the respective time segment by a transmitter.

Embodiment 33

An apparatus, comprising: a wakeup radio WUR associated with a wireless local area network (WLAN) network interface device. The WUR comprises one or more integrated circuit (IC) devices configured to: detect a WUR preamble of a wakeup packet, wherein the WUR preamble follows, in time, a WLAN legacy preamble of the wakeup packet, wherein the wakeup packet further includes a data portion comprising a plurality of time segments and prefixes between adjacent time segments, wherein each time segment includes a respective segment, in time, of a first electrical signal, and wherein each prefix includes a respective second electrical signal, and process the data portion of the wakeup packet, including: measuring a respective energy level corresponding to each time segment of the data portion, and using the respective energy level to determine a value of a respective bit corresponding to the respective time segment of the data portion.

Embodiment 34

The apparatus of embodiment 33, wherein the WUR radio comprises: energy measurement circuitry implemented on the one or more IC devices, the energy measurement circuitry being configured to measure the respective energy level corresponding to each time segment of the data portion.

Embodiment 35

The apparatus of embodiment 34, wherein the WUR radio further comprises: comparator circuitry implemented on the one or more IC devices, the comparator circuitry being configured to, one or both of: compare the respective energy level to a threshold, or compare the respective energy level to another respective energy level corresponding to the time segment.

Embodiment 36

The apparatus of embodiment 33, wherein: each energy level is a first energy level corresponding to a respective first time subsegment of the respective time segment of the data portion; the one or more IC devices are configured to: measure a respective second energy level corresponding to a respective second time subsegment of each time segment of the data portion, compare the first energy level to the second energy level, and determine the value of the respective bit using the comparison of the first energy level to the second energy level.

Embodiment 37

The apparatus of embodiment 36, wherein the one or more IC devices are configured to: measure the first energy level across the first time subsegment and a prefix that follows the first time subsegment; and measure the second energy level corresponding to the second time subsegment of the time segment comprises measuring the second energy level across the second time subsegment and a prefix that follows the second time subsegment.

Embodiment 38

The apparatus of any of embodiments 33-36, wherein the one or more IC devices are configured to measure the energy level across the entire time segment.

Embodiment 39

The apparatus of embodiment 38, wherein the one or more IC devices are configured to measure the energy level across the time segment and a prefix that follows the time segment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, performed by a first communication device, for transmitting a wakeup packet configured to cause a wakeup radio of a second communication device to prompt a wireless local area network (WLAN) network interface device of the second communication device to transition from a low power state to an active state, the method comprising:
    generating, at the first communication device, a WLAN legacy preamble of the wakeup packet;
    generating, at the first communication device, a wakeup radio (WUR) preamble of the wakeup packet;
    generating, at the first communication device, a data portion of the wakeup packet, including generating a plurality of orthogonal frequency division multiplexing (OFDM) symbols, wherein:
        the data portion comprises a plurality of time segments, each time segment including a respective segment, in time, of a first electrical signal,
        each time segment of the data portion i) corresponds to a respective information bit and ii) comprises a first time subsegment and a second time subsegment,
        generating the data portion further includes inserting i) a respective first prefix prior to each first time subsegment corresponding to the respective information bit and ii) a respective second prefix prior to each second time subsegment corresponding to the respective information bit to mitigate intersymbol interference at a receiver caused at least by multipath effects, and
        each respective first prefix and each respective second prefix includes a respective second electrical signal; and
    transmitting, by the first communication device, the wakeup packet.

2. The method of claim 1, further comprising:
    generating each first prefix as a first cyclic prefix that comprises a duplicate of an end time portion of the respective first time subsegment; and
    generating each second prefix as a second cyclic prefix that comprises a duplicate of an end time portion of the respective second time subsegment.

3. The method of claim 1, wherein:
    each time segment corresponds to a respective OFDM symbol; and
    generating the data portion includes inserting the respective first prefix prior to each OFDM symbol to mitigate intersymbol interference at the receiver.

4. The method of claim 1, wherein:
    each time segment corresponds to a respective set of multiple OFDM symbols; and
    generating the data portion includes inserting the respective first prefix prior to each set of multiple OFDM symbols to mitigate intersymbol interference at the receiver.

5. The method of claim 1, wherein each set of multiple time segments corresponds to a respective OFDM symbol.

6. The method of claim 1, wherein each respective first prefix and each respective second prefix consists of a zero power signal.

7. The method of claim 1, further comprising:
    generating each respective first prefix as a cyclic prefix that comprises a duplicate of a portion of the respective first time subsegment, and
    generating each respective second prefix as a cyclic prefix that comprises a duplicate of a portion of the respective second time subsegment.

8. The method of claim 1, further comprising:
    generating each respective first prefix and each respective second prefix as a predetermined signal.

9. The method of claim 1, wherein generating the data portion comprises generating each time segment of the data portion such that:
    the time segment corresponds to at least a time portion of an OFDM symbol with at least some subcarriers set to one or more non-zero power values when the corresponding information bit has a first value; and
    the time segment corresponds to a zero power signal when the corresponding information bit has a second value.

10. An apparatus, comprising:
    a network interface device associated with a first communication device, wherein the network interface device comprises one or more integrated circuit (IC) devices configured to:
        generate a wireless local area network (WLAN) legacy preamble of a wakeup packet, wherein the wakeup packet is configured to cause a wakeup radio of a second communication device to prompt a WLAN network interface device of the second communication device to transition from a low power state to an active state,
        generate a wakeup radio (WUR) preamble of the wakeup packet, and generate a data portion of the wakeup packet, including generating a plurality of orthogonal frequency division multiplexing (OFDM) symbols, wherein:
the data portion comprises a plurality of time segments, each time segment including a respective segment, in time, of a first electrical signal,
each time segment of the data portion i) corresponds to a respective information bit and ii) comprises a first time subsegment and a second time subsegment,
generating the data portion further includes inserting i) a respective first prefix prior to each first time subsegment corresponding to the respective information bit and ii) a respective second prefix prior to each second time subsegment corresponding to the respective information bit to mitigate intersymbol interference at a receiver caused at least by multipath effects, and
each respective first prefix and each respective second prefix includes a respective second electrical signal; and
wherein the one or more IC devices are further configured to transmit the wakeup packet.

11. The apparatus of claim 10, wherein the network interface device comprises:
an inverse discrete Fourier transform (IDFT) calculator implemented on the one or more IC devices, the IDFT being configured to generate the plurality of OFDM symbols.

12. The apparatus of claim 11, wherein the network interface device further comprises:
prefix inserter circuitry implemented on the one or more IC devices, the prefix inserter circuitry being configured to insert i) the respective first prefix prior to each first time subsegment and ii) the respective second prefix prior to each second subsegment.

13. The apparatus of claim 10, wherein the one or more IC devices are configured to:
generate each first prefix as a first cyclic prefix that comprises a duplicate of an end time portion of the respective first time subsegment; and
generate each second prefix as a second cyclic prefix that comprises a duplicate of an end time portion of the respective second time subsegment.

14. The apparatus of claim 10, wherein:
each time segment corresponds to a respective OFDM symbol; and
the one or more IC devices are configured to insert the respective first prefix prior to each OFDM symbol to mitigate intersymbol interference at the receiver.

15. The apparatus of claim 10, wherein:
each time segment corresponds to a respective set of multiple OFDM symbols; and
the one or more IC devices are configured to insert the respective first prefix prior to each set of multiple OFDM symbols to mitigate intersymbol interference at the receiver.

16. The apparatus of claim 10, wherein
each set of multiple time segments corresponds to a respective OFDM symbol.

17. The apparatus of claim 10, wherein each respective first prefix and each respective second prefix consists of a zero power signal.

18. The apparatus of claim 10, wherein the one or more IC devices are configured to:
generate each respective first prefix as a cyclic prefix that comprises a duplicate of a portion of the respective first time subsegment, and
generate each respective second prefix as a cyclic prefix that comprises a duplicate of a portion of the respective second time subsegment.

19. The apparatus of claim 10, wherein the one or more IC devices are configured to:
generate each respective first prefix and each respective second prefix as a predetermined signal.

20. The apparatus of claim 10, wherein the one or more IC devices are configured to generate each time segment of the data portion such that:
the time segment corresponds to at least a time portion of an OFDM symbol with at least some subcarriers set to one or more non-zero power values when the corresponding information bit has a first value; and
the time segment corresponds to a zero power signal when the corresponding information bit has a second value.

21. A method, performed by a first communication device, for transmitting a wakeup packet configured to cause a wakeup radio of a second communication device to prompt a wireless local area network (WLAN) network interface device of the second communication device to transition from a low power state to an active state, the method comprising:
generating, at the first communication device, a WLAN legacy preamble of the wakeup packet;
generating, at the first communication device, a wakeup radio (WUR) preamble of the wakeup packet;
generating, at the first communication device, a data portion of the wakeup packet, including generating a plurality of orthogonal frequency division multiplexing (OFDM) symbols, wherein:
the data portion comprises a plurality of time segments, each time segment including a respective segment, in time, of a first electrical signal,
each time segment of the data portion i) corresponds to a respective information bit and ii) comprises a first time subsegment and a second time subsegment,
generating the data portion comprises generating each time segment of the data portion such that:
when the corresponding information bit has a first value:
the first time subsegment of the time segment corresponds to at least a time portion of an OFDM symbol with at least some subcarriers set to one or more non-zero power values, and
the second time subsegment of the time segment corresponds to a zero power signal, and
when the corresponding information bit has a second value:
the first time subsegment of the time segment corresponds to the zero power signal, and
the second time subsegment of the time segment corresponds to at least the time portion of the OFDM symbol with at least some subcarriers set to the one or more non-zero power values,
generating the data portion further includes inserting i) a respective first prefix prior to each first time subsegment corresponding to the respective information bit and ii) a respective second prefix prior to each second time subsegment corresponding to the respective information bit to mitigate intersymbol interference at a receiver caused at least by multipath effects, and each respective first prefix and each respective second prefix includes a respective second electrical signal; and transmitting, by the first communication device, the wakeup packet.

22. The method of claim 21, further comprising:
generating each first prefix as a first cyclic prefix that comprises a duplicate of an end time portion of the respective first time subsegment; and
generating each second prefix as a second cyclic prefix that comprises a duplicate of an end time portion of the respective second time subsegment.

23. An apparatus, comprising:
a network interface device associated with a first communication device, wherein the network interface device comprises one or more integrated circuit (IC) devices configured to:
  generate a wireless local area network (WLAN) legacy preamble of a wakeup packet, wherein the wakeup packet is configured to cause a wakeup radio of a second communication device to prompt a WLAN network interface device of the second communication device to transition from a low power state to an active state,
  generate a wakeup radio (WUR) preamble of the wakeup packet, and
  generate a data portion of the wakeup packet, including generating a plurality of orthogonal frequency division multiplexing (OFDM) symbols, wherein:
    the data portion comprises a plurality of time segments, each time segment including a respective segment, in time, of a first electrical signal,
    each time segment of the data portion i) corresponds to a respective information bit and ii) comprises a first time subsegment and a second time subsegment,
    generating the data portion comprises generating each time segment of the data portion such that:
      when the corresponding information bit has a first value:
        the first time subsegment of the time segment corresponds to at least a time portion of an OFDM symbol with at least some subcarriers set to one or more non-zero power values, and
        the second time subsegment of the time segment corresponds to a zero power signal; and
      when the corresponding information bit has a second value:
        the first time subsegment of the time segment corresponds to the zero power signal, and
        the second time subsegment of the time segment corresponds to at least the time portion of the OFDM symbol with at least some subcarriers set to the one or more non-zero power values,
    generating the data portion further includes inserting i) a respective first prefix prior to each first time subsegment corresponding to the respective information bit and ii) a respective second prefix prior to each second time subsegment corresponding to the respective information bit to mitigate intersymbol interference at a receiver caused at least by multipath effects, and
    each respective first prefix and each respective second prefix includes a respective second electrical signal; and
  wherein the one or more IC devices are further configured to transmit the wakeup packet.

24. The apparatus of claim 23, wherein the one or more IC devices are configured to:
generate each first prefix as a first cyclic prefix that comprises a duplicate of an end time portion of the respective first time subsegment; and
generate each second prefix as a second cyclic prefix that comprises a duplicate of an end time portion of the respective second time subsegment.

* * * * *